US007085825B1

(12) United States Patent  
Pishevar et al.

(10) Patent No.: US 7,085,825 B1
(45) Date of Patent: Aug. 1, 2006

(54) APPARATUS, METHOD AND SYSTEM FOR IMPROVING APPLICATION PERFORMANCE ACROSS A COMMUNICATIONS NETWORK

(75) Inventors: Shervin Pishevar, Kensington, MD (US); Lewis Bloch, Catonsville, MD (US); Drew Morris, Alpine, NJ (US); Daniel F. Savarese, Columbia, MD (US); Kevin Andrew Walsh, Raleigh, NC (US)

(73) Assignee: Freewebs Corp., Silver Spring, MD (US)

( * ) Notice: Subject to any disclaimer, the term of this patent is extended or adjusted under 35 U.S.C. 154(b) by 628 days.

(21) Appl. No.: 09/849,879

(22) Filed: May 4, 2001

Related U.S. Application Data

(60) Provisional application No. 60/278,876, filed on Mar. 26, 2001.

(51) Int. Cl.
*G06F 15/177* (2006.01)

(52) U.S. Cl. .................. 709/221; 709/204; 709/220; 709/222; 709/226; 709/238; 709/241; 718/100; 718/101; 718/102; 718/103; 718/104; 718/105; 718/106

(58) Field of Classification Search ............... 709/204, 709/238, 241, 220–222, 226; 718/100–106
See application file for complete search history.

(56) References Cited

U.S. PATENT DOCUMENTS

| 6,078,943 | A * | 6/2000 | Yu .............................. 718/105 |
| 6,195,680 | B1 * | 2/2001 | Goldszmidt et al. ......... 709/203 |
| 6,424,992 | B1 * | 7/2002 | Devarakonda et al. ...... 709/203 |
| 6,587,866 | B1 * | 7/2003 | Modi et al. .................. 718/105 |
| 2002/0078263 | A1 * | 6/2002 | Darling et al. .............. 709/331 |
| 2002/0194251 | A1 * | 12/2002 | Richter et al. .............. 709/105 |
| 2002/0199014 | A1 * | 12/2002 | Yang et al. .................. 709/238 |
| 2003/0126200 | A1 * | 7/2003 | Wolff .......................... 709/203 |
| 2005/0010653 | A1 * | 1/2005 | McCanne .................... 709/219 |

\* cited by examiner

*Primary Examiner*—Dov Popovici
*Assistant Examiner*—Niketa I. Patel
(74) *Attorney, Agent, or Firm*—Charles A. Rattner

(57) ABSTRACT

An apparatus, method and system to enable dynamic replication of Web servers across a wide area in response to access patterns by Web clients as well as in response to customer requests. The method for dynamically replicating one or more parent nodes on a network in response to a user request by a policy manager. The policy manager transmits the user request to an event module. The event module transmits the user request to a data consistency module, wherein the data consistency module maintains integrity of the data on the parent node. The event system communicates with a resource management module to ensure proper utilization of network resources, and transmits the routing request to a request routing module for appropriately balancing the network load. The request routing module is capable of providing optimal routing based on the network resources.

7 Claims, 16 Drawing Sheets

APPARATUS, METHOD AND SYSTEM FOR IMPROVING APPLICATION PERFORMANCE ACROSS A COMMUNICATIONS NETWORK

Priority is claimed under 35 U.S.C. §119(e) for: Provisional Application No. 60/278,876, filed Mar. 26, 2001.

FIELD

The present invention relates generally to computer systems and server software, and more particularly to an apparatus, method, and system for creating, managing and positioning application instances in strategic locations to increase utility and performance across a communications network.

BACKGROUND

Information Technology Systems

Typically, users, which may be people or other systems, engage computers to facilitate information processing. A computer operating system enables and facilitates users to access and operate computer information technology. Information technology systems provide interfaces that allow users to access and operate the various systems.

User Interface

The function of computer interfaces such as cursors, menus, and window components are, in many respects, similar to automobile operation interfaces. Automobile operation interfaces such as steering wheels, gearshifts, and speedometers facilitate the access, operation, and display of automobile resources, functionality, and status. Computer interaction interfaces such as cursors, menus, and windows similarly facilitate the access, operation, and display of computer hardware and operating system resources, functionality, and status. Operation interfaces are commonly called user interfaces. Graphical user interfaces (GUIs) such as the Apple Macintosh Operating System or Microsoft's Windows provide a baseline and means of accessing and displaying information.

Networks

Networks are commonly thought to consist of the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." A computer, other device, software, or combination thereof that facilitates, processes information and requests, and/or furthers the passage of information from a source user to a destination user is commonly referred to as a "node." Networks are generally thought to facilitate the transfer of information from source points to destinations.

Transmission Control Protocol-Internet Protocol (TCP/IP)

The proliferation and expansion of computer systems, databases, and networks of computers has been facilitated by an interconnection of such systems and networks in an extraterritorial communications network commonly referred to as the Internet. The Internet has developed and largely employs the Transmission Control Protocol-Internet Protocol (TCP/IP). TCP/IP was developed by a Department of Defense (DoD) research project to interconnect networks made by various and varying network vendors as a foundation for a network of networks, i.e., the Internet. The development of TCP/IP was in part driven by a requirement by the DoD to have a network that will continue to operate even if damaged during battle, thus allowing for information to be routed around damaged portions of the communications network to destination addresses. Of course, if the destination address itself is rendered inoperable, such routing will not be possible.

The Internet is a packet-switched network and thus, information on the Internet is broken up into pieces, called packets, and transmitted in packet form. The packets contain IP addressing information called headers, which are used by routers to facilitate the delivery of the packets from a source to a destination across intermediary nodes on the Internet.

The IP component of the protocol is responsible for routing packets of information based on a four byte addressing mechanism; the address is written as four numbers separated by dots, each number ranging from 0 to 255, e.g., "123.255.0.123". IP addresses are assigned by Internet authorities and registration agencies, and are unique.

The TCP portion of the protocol is used for verifying that packets of information are correctly received by the destination computer from the source, and if not, to retransmit corrupt packets. Other transmission control protocols are also commonly used that do not guarantee delivery, such as User Datagram Protocol (UDP).

World Wide Web

The proliferation and expansion of computer systems, databases, the Internet, and particularly the World Wide Web (the web), have resulted in a vast and diverse collection of information. Various user interfaces that facilitate the interaction of users with information technology systems (i.e., people using computers) are currently in use. An information navigation interface called WorldWideWeb.app (the web) was developed in late 1990. Subsequently, information navigation interfaces such as web browsers have become widely available on almost every computer operating system platform.

Generally, the web is the manifestation and result of a synergetic interoperation between user interfaces (e.g., web browsers), servers, distributed information, protocols, and specifications. Web browsers were designed to facilitate navigation and access to information, while information servers were designed to facilitate provision of information. Typically, web browsers and information servers are disposed in communication with one another through a communications network. As such, information servers typically provide information to users employing web browsers for navigating and accessing information about the web. Microsoft's Internet Explorer and Netscape Navigator are examples of web browsers. In addition, navigation user interface devices such as WebTV have also been implemented to facilitate web navigation. Microsoft's Information Server and Apache are examples of information servers, i.e., their function is to serve information to users that typically access the information by way of web browsers.

Distributed Information Technology

The proliferation and expansion of computer information systems coincides with an increase in demand on network applications. The increased use of various applications across communications networks has resulted in increased network traffic. Furthermore, new network applications increasingly involve larger sized transmissions, which has resulted in increased bandwidth problems. The growing use of applications across communications network has resulted in an overall problem with regard to network application transactions and transmission delivery speeds. Such network speed problems in many instances frustrate users.

SUMMARY

One embodiment of the present invention solves many of the above network bandwidth, speed, and traffic problems by employing dynamic application replication and resource allocation. In a nutshell, application replication is a mechanism for allowing users/subscribers of the present invention to dynamically create copies of software on different servers (i.e., computer hardware nodes) and enabling the applications in new environments, while maintaining consistency of their datasets on the different nodes.

In one embodiment of the present invention, the system comprises Web servers that are capable of dynamically replicating themselves across the wide area in response to access patterns by Web clients. The present system enables scaling across temporal and geographic spikes in client demand for particular Web services. According to this embodiment, the system allows a server to shed its load onto other idle servers within the network. The other idle servers are able to satisfy the same requests as the original server, including requests for both static as well as dynamically generated objects.

According to another embodiment of the present invention, the system is capable of dynamically (i.e., without human intervention) receiving a customers' request for nodal activity on one or more servers at different geographical locations within the network. The nodal activity by the customer may comprise a request for a new node(s) to use, removal of existing node(s) from use, changing the usage pattern with respect to existing node(s). In response, the present system automatically, and on the fly, creates, deletes and/or modifies nodes to accommodate the users' requests.

The present invention is capable of replicating an existing node by replicating applications and/or data from an existing node to a new node in response to a user request. Replicating existing nodes requires that the system ensure data and application between the different nodes belonging to a given user, process and/or a process, as well as to the new node being created. On the other hand, where existing nodes are to be deleted, processes on nodes are to be turned on and/or off, and/or operational policies of the nodes reprogrammed, the present system ensures that the integrity and consistency of the existing applications and/or data is maintained.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the present invention.

DETAILED DESCRIPTION

Actors and Resources

The present invention involves various actors and/or resources. Generally, the actors take on three forms: (1) accessers such as a user and/or commuter, (2) providers, and (3) facilitators such as an Application Replicator Server (ARS) 125. An accesser may be a human and/or system embodying the role of a buyer, client, customer, user, and/or the like. Accessers and providers may affect the access of a resource. A provider may be a human, entity, seller, system, and/or user that engages in the purveying of goods, information, services, and/or the like. Typically a provider engages in commerce. A facilitator facilitates in matching the wants and/or requests of accessers with the provisions of providers. In the context of electronic commerce (E-commerce) one or more computer systemizations executing software (such as information server software) may embody the purveying role of the facilitator.

A typical resource is an information server, which may be a computer systemization 102. An information server module 116 is software that executes on an information server and/or centralized controller 101 of FIG. 1. An ARS facilitates communications between accessers and providers. The ARS 425 is another resource, which may be employed by accessers such as buyers, through a facilitator so as to affect and/or obtain information from the provider. Resources may also be controllers, conventional computer systems and software, associated enabling systems and/or software, and/or the like.

With reference to the figures, various embodiments of the present invention will now be described in greater detail. It is to be understood that the tasks shown in the figures and described in this description can be sequenced in many different orders to achieve the desired result. The order or sequence of tasks illustrated in the figures is merely intended to be exemplary of the concepts defined herein.

Centralized Controller

Figure 1:
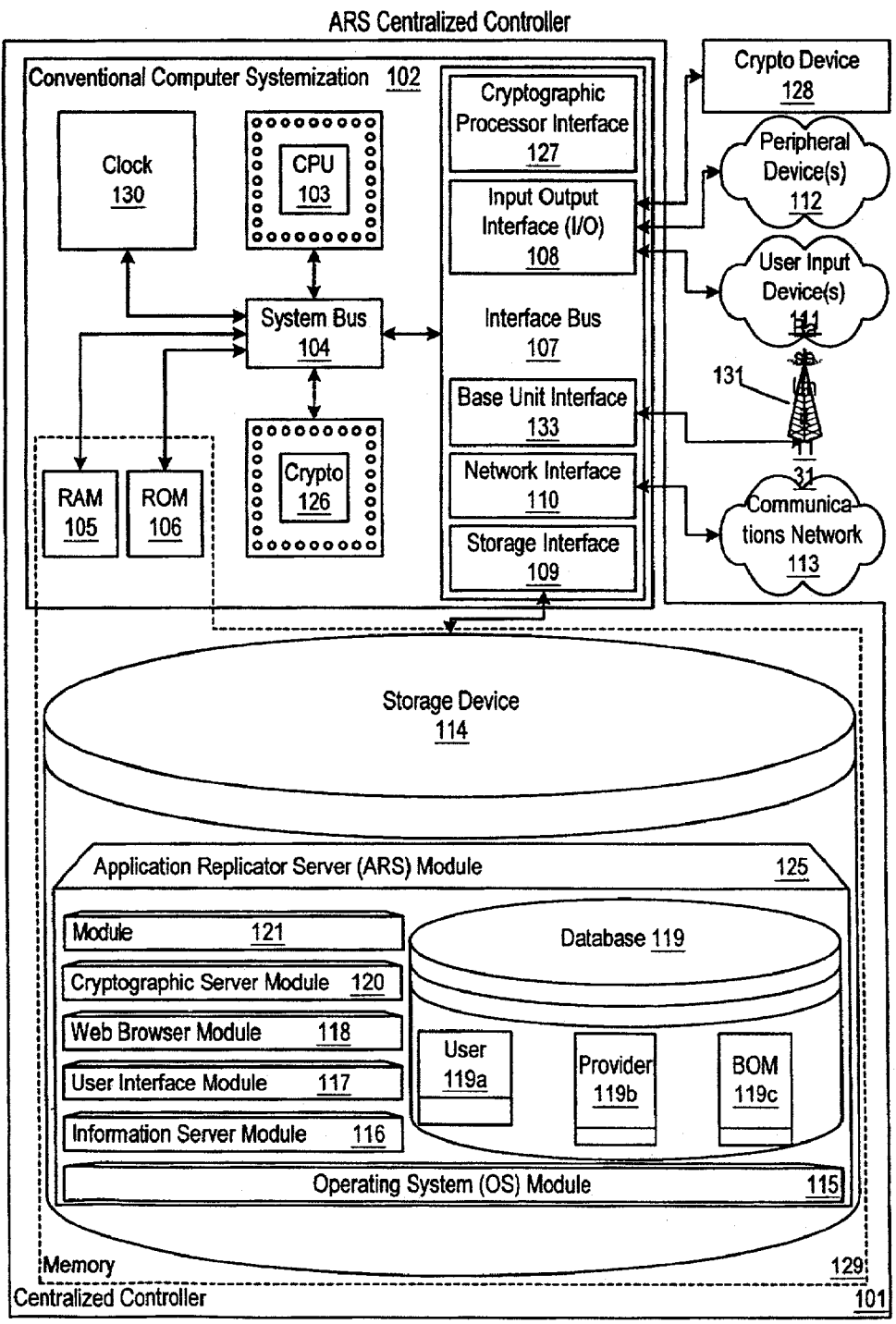
FIG. 1 illustrates a centralized controller according to one embodiment.

FIG. 1 illustrates one embodiment incorporated into a centralized controller. In this embodiment, the centralized controller 101 may be connected to and/or communicate with entities such as, but not limited to: one or more users from user input devices 111; peripheral devices 112; base units 131, and/or a communications network 113. The centralized controller may even be connected to and/or communicate with a cryptographic processor device 128.

A typical centralized controller 101 may be based on common computer systems that may comprise, but are not limited to, components such as: a computer systemization 102 connected to a storage device 114. Storage devices may be a fixed hard disk drive, and/or other devices of the like.

A computer systemization 102 may comprise a clock 130, central processing unit (CPU) 103, a read only memory (ROM) 106, a random access memory (RAM) 105, and/or an interface bus 107, and conventionally, although not necessarily, are all interconnected and/or communicating through a system bus 104. The system clock typically has a crystal oscillator and provides a base signal. The clock is typically coupled to the system bus and various means known to those skilled in the art will increase or decrease the base operating frequency for other components interconnected in the computer systemization. The clock and various components in a computer systemization drive signals embodying information throughout the system. Optionally, a cryptographic processor 126 may similarly be connected to the system bus. Of course, any of the above components may be connected directly to one another, connected to the CPU, and/or organized in numerous variations employed as exemplified by conventional computer systems.

A centralized controller and/or a computer systemization may employ various forms of memory 129. In a typical configuration, the memory 129 may include ROM, RAM, and a storage device. Non-conventional software modules such as an ARS Module 125, may be loaded into memory.

The CPU comprises at least one high-speed data processor adequate to execute program modules for executing user and/or system-generated requests. The CPU is a conventional microprocessor such as the Intel Pentium Processor and/or the like. The CPU interacts memory to execute stored program code according to conventional data processing techniques.

Interface bus(ses) 107 may accept, connect, and/or communicate to a number of interface adapters, conventionally although not necessarily in the form of adapter cards, such as but not limited to: input output interfaces (I/O) 108, storage interfaces 109, network interfaces 110, and/or the like. Optionally, cryptographic processor interfaces 127 similarly may be connected to the interface bus. The interface bus provides for the communications of interface adapters with one another as well as with other components of the computer systemization. Interface adapters are adapted for a compatible interface bus. Interface adapters conventionally connect to the interface bus via slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (PCI), Personal Computer Memory Card International Association (PCMCIA), and/or the like.

Storage interfaces 109 may accept, communicate, and/or connect to a number of storage devices such as, but not limited to: storage devices 114, removable disc devices, and/or the like. Storage interfaces may employ connection protocols such as, but not limited to: (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 110 may accept, communicate, and/or connect to a communications network 113. Network interfaces may employ connection protocols such as, but not limited to direct connect, Ethernet (thick, thin, twisted pair 10/100/1000 Base T, and/or the like), IEEE 802.11b, Token Ring, wireless connection, and/or the like. A communications network may be: a direct connection; the Internet; a Local Area Network (LAN); a secured custom connection; a Wide Area Network (WAN); a wireless network (e.g., employing protocols such as, but not limited to a Wireless Application Protocol (WAP), I-mode, etc.); and/or the like. A network interface may be regarded as a specialized form of an input/output interface. Base unit interfaces 133 may be conventional network interface 110 and/or variants thereof that are connected to base units 131. An example of a base unit interface 133 is a T1/E1 connection.

I/O interfaces 108 may accept, communicate, and/or connect to user input devices 111, peripheral devices 112, cryptographic processor devices 128, and/or the like. I/O may employ connection protocols such as, but not limited to: Apple Desktop Bus (ADB); Apple Desktop Connector (ADC); audio: analog, digital, monaural, RCA, stereo, and/or the like IEEE 1394; infrared; joystick; keyboard; midi; optical; PC AT; PS/2; parallel; radio; serial; USB; video: BNC, composite, digital, RCA, S-Video, VGA, and/or the like; wireless; and/or the like. A common output device is a video display, which typically comprises a CRT with an interface (e.g., VGA circuitry and cable) that accepts signals from a video interface. The video interface composites information generated by a computer systemization and generates video signals based on the composited information. Typically, the video interface provides the composited video information through a video connection interface that accepts a video display interface (e.g., a VGA connector accepting a VGA display cable).

User input devices 111 may be card readers, dongles, finger print readers, gloves, graphics pads, joysticks, keyboards, mouse (mice), trackballs, trackpads, retina readers, and/or the like.

Peripheral devices 112 may be connected and/or communicate with or to I/O and/or with or to other facilities of the like such as network interfaces, storage interfaces, and/or the like). Peripheral devices may be cameras, dongles (for copy protection, ensuring secure transactions as a digital signature, and/or the like), external processors (for added functionality), goggles, microphones, monitors, network interfaces, printers, scanners, storage devices, visors, and/or the like.

Cryptographic units such as, but not limited to, microcontrollers, processors 126, interfaces 127, and/or devices 128 may be attached, and/or communicate with the centralized controller. In one embodiment, a MC68HC16 microcontroller, commonly manufactured by Motorola Inc., may be used for and/or within cryptographic units. The MC68HC 16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner284.

A storage device 114 may be any conventional computer system storage. Commonly a storage device is a fixed hard disk. However, it is to be understood that a computer systemization may be configured to employ many types of memory 129. For example, a computer systemization may be configured wherein the functionality of on-chip CPU memory (e.g., registers), RAM, ROM, and any other storage devices are provided by a paper punch tape or paper punch card mechanism; of course such an embodiment is not preferred and would result in an extremely slow rate of operation. Generally, any mechanization and/or embodiment allowing a processor to affect the storage and/or retrieval of information is memory 129. Thus, a computer systemization generally requires and makes use of memory. However, memory is a fungible technology and resource, thus, any number of memory embodiments may be employed in lieu of or in concert with one another.

The storage devices 114 may contain a collection of program and/or database modules and/or data such as, but not limited to: an operating system module 115 (operating system); an information server module 116 (information server); a user interface module 117 (user interface); a web browser module 118 (web browser); databases 119 including tables such as but not limited to a user table 119a, provider table 119b, Bill of Materials (BOM) table 119c (tracking requests, advertisements, and/or the like), Module-type table 119d, advertisements table 119e, and/or the like; a cryptographic server module 120 (cryptographic server); ARS module 125, and/or the like (i.e., collectively a module collection). These modules may be stored and accessed from the storage devices and/or from storage devices accessible through an interface bus. Although these modules typically and preferably are stored in a local storage device, they may also be stored in peripheral devices, RAM, remote storage facilities through a communications network, ROM, and/or the like.

The operating system 115 is executable program code facilitating the operation of a centralized controller. Typically, the operating system facilitates access of I/O, network interfaces, peripheral devices, storage devices, and/or the like. The operating system preferably is a conventional product such as a Microsoft Windows NT Server and/or Unix operating systems. Preferably, the operating system is highly fault tolerant, scalable, and secure. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may interact with base units, communications networks, data, I/O, peripheral devices, program modules, memory, user input devices, and/or the like. Preferably, the operating system provides communications protocols that allow the centralized controller to communicate with other entities through a communications network 113. The preferred protocol for communicating a communications network is transmission control protocol Internet protocol (TCP/IP). Protocols for communicating with base units 131 may include TCP/IP, X.25, SNA, and/or the like; the preferred embodiment will depend on the base unit to which an ARS is attached and/or other deployment factors.

Decentralized Controllers

Figure 2:
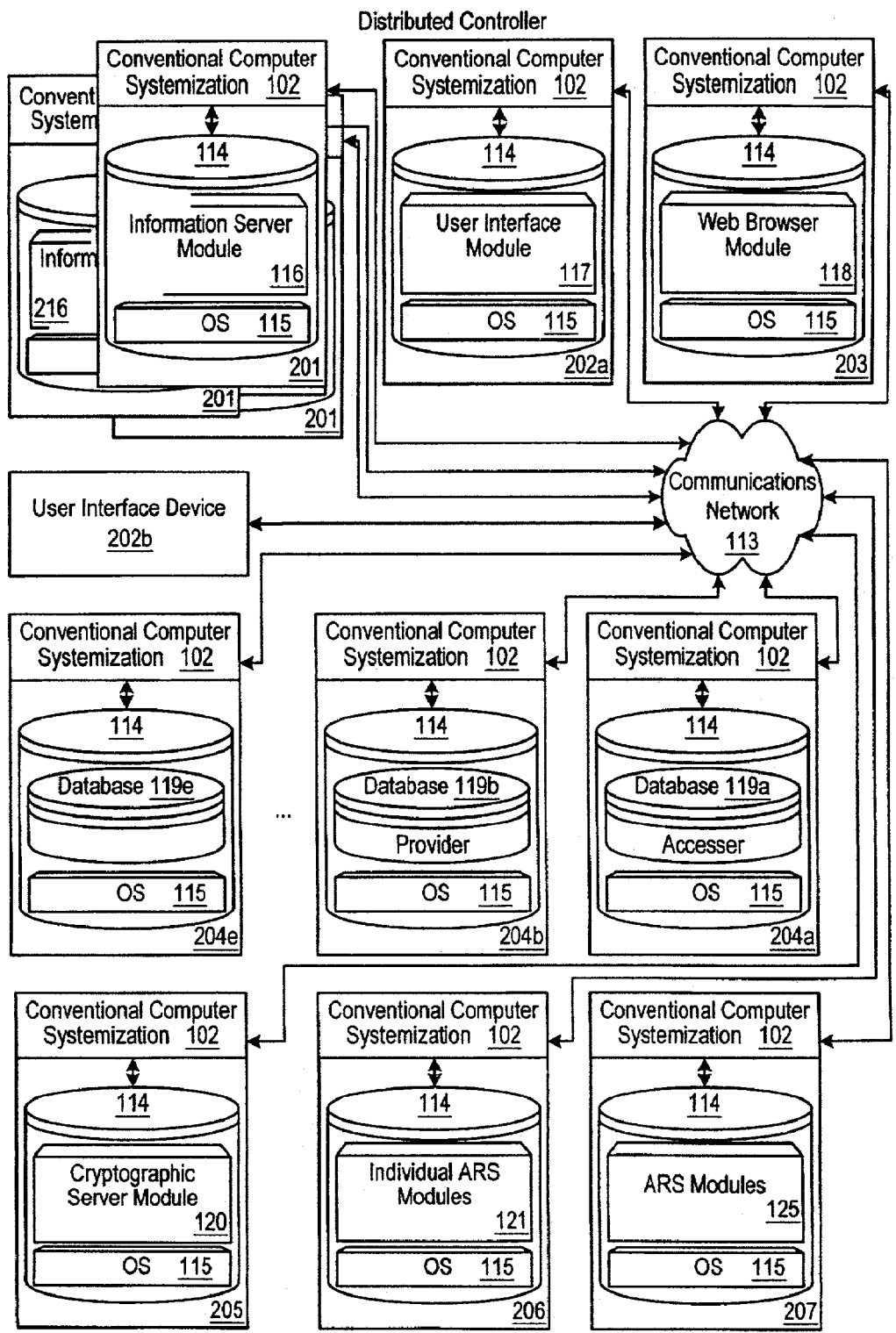
FIG. 2 illustrates another embodiment in the form of a distributed system through a communications network.

FIG. 2 illustrates another embodiment of a system incorporating the present disclosure. In this embodiment, the centralized controller 101 embodiment of FIG. 1 has been decentralized into components such as, but not limited to: an information server controller 201; user interface controller 202a and/or alternatively a user interface device 202b; a web browser controller 203; database controllers such as, but not limited to accesser database controllers 204a, provider database controllers 204b, transaction database controllers (not shown in the Figure), Time & Place database controllers (not show in the Figure), advertisements database controllers, and/or the like; a cryptographic controller 205; a ARS controller 206; and a predictive cache controller 207, and/or the like (i.e., collectively decentralized server controllers). The aforementioned controllers of FIG. 2 may be attached, coupled, interconnected, and/or communicate through the communications network 113 and/or like facility.

An information server controller 201 is comprised similarly to the centralized controller of FIG. 1 except it does not require an entire module collection other than an information server module. An information server module 116 is stored program code that is executed by the CPU. The information server may be a conventional Internet information server such as, but not limited to, Microsoft's Internet Information Server and/or the Apache Software Foundation's Apache. Preferably, the information server allows for the execution of program modules through facilities such as C++, Java, JavaScript, ActiveX, Common Gateway Interface (CGI) scripts, Active Server Page (ASP), and/or the like. Preferably the information server supports secure communications protocols such as, but not limited to, Secure Hypertext Transfer Protocol (HTTPS), Secure Socket Layer (SSL), and/or the like. Conventionally, an information server provides results in the form of web pages to web browsers, and allows for the manipulated generation of the web pages through interaction with other program modules. An information server may communicate to and/or with other modules in a module collection, including itself, and/or facilities of the like. Most frequently, the information server communicates with operating systems, other program modules, user interfaces, web browsers, and/or the like. An information server may contain, communicate, generate, obtain, and/or provide program module, system, user, and/or data communications, requests, and/or responses.

In an alternative embodiment, the information server controller 201 may itself be further distributed across several computer systemizations. The information server modules 116, may itself run partially on the various computer systemizations such that part of the information server module 116 runs on the numerous systemizations to increase both fault tolerance and load balancing. It is to be understood that any single and/or multiple program modules may similarly be distributed across several computer systemizations for similar and/or varying reasons.

A user interface controller 202a is comprised similarly to the centralized controller of FIG. 1 except it does not require an entire module collection other than an user interface module 117. A user interface is stored program code that is executed by the CPU. Preferably, the user interface is a conventional user interface as provided by, with, and/or atop operating systems and/or operating environments such as Apple Macintosh OS, e.g., Aqua, Microsoft Windows (NT), Unix X Windows (KDE, Gnome, and/or the like), and/or the like. The user interface may allow for the display, execution, interaction, manipulation, and/or operation of program modules and/or system facilities through graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

In alternative embodiments, a user interface device 202b may take the place of and/or be used in conjunction with a user interface controller. The user interface device may be a consumer electronics online access device (e.g., Philips Magnavox Inc.'s WebTV), personal digital assistant (PDA), pager, cellular telephone, a terminal, and/or the like.

A web browser controller 203 is comprised similarly to the centralized controller of FIG. 1 except it does not require an entire module collection other than web browser module 118. A web browser is stored program code that is executed by the CPU. Preferably, the web browser is a conventional hypertext viewing application such as Microsoft Internet Explorer or Netscape Navigator (preferably with 128 bit encryption by way of HTTPS, SSL, and/or the like). Some web browsers allow for the execution of program modules through facilities such as Java, JavaScript, ActiveX, and/or the like. Web browsers and like information access tools may be integrated into PDAs, cellular telephones, and/or other mobile devices. A web browser may communicate to and/or with other modules in a module collection, including itself, and/or facilities of the like. Most frequently, the web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a web browser a proprietary accesser controller may be developed to perform similar functions. An accesser module would similarly affect the obtaining and the provision of information to accessers, providers, providers' agents, and facilitators from an ARS and/or any proprietary facilitator systems. The accesser module may be nugatory on systems employing standard web browsers. For added security, such an accesser module, and consequently any resulting accesser controllers, could be configured to communicate directly with the ARS without an intermediary information server to further enhance security.

The database controllers 204 are comprised similarly to the centralized controller of FIG. 1 except it does not require an entire module collection other than database modules 119. A database is stored program code that is executed by the CPU and it is stored data; the stored program code portion configuring the CPU to process the stored data. Preferably, the database is a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship. A database may communicate to and/or with other modules in a module collection, including itself, and/or facilities of the like. Most frequently, the database communicates with information servers, operating systems, other program modules, and/or the like. The database may contain, communicate, generate, obtain, and/or provide program module, system, user, and/or data communications, requests, and/or responses.

Databases may be consolidated and/or distributed in countless variations through standard data processing techniques. Portions of databases, e.g., tables, may be exported and/or imported and thus decentralized and/or integrated. In one embodiment, a predictive cache database 119 of FIG. 1 may be implemented to include accesser 119a, provider 119b, Bill of Materials 119c, modules 119d, and advertisements 119e tables. In an alternative embodiment, these tables have been decentralized into their own databases and their respective database controllers (i.e., accesser database controller 204a, provider database controller 204b, transaction database controller 204c, time and place database controller 204d, and advertisements database controller 204e). Of course, employing standard data processing techniques, one may further distribute the databases over several computer systemizations and/or storage devices. Similarly, configurations of the database controllers 204 may be varied by consolidating and/or distributing the various database modules 119a–e. The ARS system may be configured to keep track of accesser requests and various transactions tracking via database controllers 204a–e.

An accesser database controller 204a is a specialized controller designed to facilitate accesser-related transactions. A facilitator may maintain an accesser database to keep track of accessers' accounts and/or transactions. The accesser database controller employs an accesser database module 119a.

A provider database controller 204b is a specialized controller designed to facilitate provider-related transactions. The provider database may store information such as, but not limited to advertisements, locations of data to cache, data to cache, and/or the like.

A transaction database controller 204c is a specialized controller designed to facilitate both accesser and provider transactions. The transaction database may store information relating to a transaction such as, but not limited to accesser requests, and provider replies, requested data, and/or the like.

A time and place database controller 204d is a specialized controller designed to facilitate transactions. The time and place database may store information relating to the whereabouts of various base units, providers, accessers, and/or the like. Furthermore, the database may store availability and demand levels at certain times for those base units, providers, accessers, and/or the like.

An advertisement database controller 204e is a specialized controller designed to facilitate advertising. The advertisements database may store advertisement, targeting criteria for the advertisement, and/or the like.

A cryptographic server controller 205 is comprised similarly to the centralized controller of FIG. 1 except it does not require an entire module collection other than cryptographic server module 220. A cryptographic server module is stored program code that is executed by the CPU 103 of FIG. 1, cryptographic processor 126 of FIG. 1, cryptographic processor interface 127 of FIG. 1, cryptographic processor device 128 of FIG. 1, and/or the like. The cryptographic processor interfaces may allow for expedition of encryption and/or decryption requests by the cryptographic server; however, the cryptographic server, alternatively, may run on a conventional CPU. The cryptographic server may allow for the encryption and/or decryption of provided data. The cryptographic server may also allow for both symmetric and asymmetric (e.g., Pretty Good Protection (PGP)) encryption and/or decryption. The cryptographic server may further allow conventional cryptographic techniques such as, but not limited to digital certificates (e.g., X.509 authentication framework), digital signatures, dual signatures, enveloping, public key management, and/or the like. In addition, the cryptographic server may facilitate numerous encryption and/or decryption protocols such as, but not limited to: Data Encryption Standard (DES), Elliptical Curve Encryption (ECC), International Data Encryption Algorithm (IDEA), Message Digest 5 (MD5, which is a one way hash function), RC5 (Rivest Cipher), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like.

A cryptographic server may communicate to and/or with other modules in a module collection, including itself, and/or facilities of the like. The cryptographic server may support encryption schemes allowing for the secure transmission of information across a communications network. Often, the cryptographic server communicates with information servers, operating systems, other program modules, and/or the like. The cryptographic server may contain, communicate, generate, obtain, and/or provide program module, system, user, and/or data communications, requests, and/or responses.

An ARS server controller 206 is comprised similarly to the centralized controller of FIG. 1 except it does not require an entire module collection other than an ARS module 125. As noted above, the ARS module 125 is stored program code that is executed by the CPU. Generally, the ARS 125 affects obtaining and the provision of communication, information, transactions, and/or the like between facilitator modules for accessers. The ARS 125 adds the ability to anticipate, predict, prefetch and ready information for subsequent accesser requests before the accessers make any such requests. Generally, the ARS 125 acts as an interface to accessers requesting data and the data providers. The ARS 125 coordinates with the various database controllers to predict data requests and provide the predicted data to accessers by prefetching the anticipated requests into a predictive cache. The ARS that enables communications between a provider and a facilitator's commerce systems maybe be developed by employing standard development tools such as, but not limited to: C, shell scripts, Java, Javascript, SQL commands, web application server extensions, Apache modules, Perl scripts, binary executables, and/or other mapping tools, and/or the like. Some embodiments may also and/or alternatively employ a mix of program modules such as, but not limited to modules discussed in FIG. 4, and/or the like. According to one embodiment, the ARS server employs a cryptographic server to encrypt and decrypt communications. The ARS may store requests, store requested data, anticipate and prefetch data, provide predictive advertising, retrieve accesser requests, and much more. The ARS server may communicate to and/or with other modules in a module collection, including itself, and/or facilities of the like. Most frequently, the ARS server communicates with databases, information servers, operating systems, other program modules, and/or the like. The ARS server may contain, communicate, generate, obtain, and/or provide program module, system, user, and/or data communications, requests, and/or responses.

The predictive cache controller 207 is comprised similarly to the centralized controller of FIG. 1 except it does not require an entire module collection other than the RS module 125. A predictive cache is a repository where data cached by an ARS is stored. The predictive cache itself may simply be a file system for storing cached data into a storage device 114, or in an alternative embodiment, the predictive cache may be a database and/or database table that stores data as instructed by the ARS. A cache is stored data; the stored data is typically a copy of requested data from a provider, which typically, is more remote from an accesser. The cached data may be accessed in lieu of a more remote source of the data, thereby improving overall processing speed. The predictive cache is the reservoir of data flow being controlled by an ARS. In one non-limiting embodiment, the ARS fills the predictive cache with common search requests made between accessers and providers. However, a predictive cache may act as an accelerating buffer between any number of systems and databases. The predictive cache may store transactions. A cache may be a communications medium facilitating communication between modules in a module collection, including itself, and/or facilities of the like. Most frequently, the predictive cache communications with a ARS, information server(s), operating system(s), other program module(s), and/or the like; e.g. it may contain, communicate, generate, obtain, and/or provide program module, system, user, and/or data communication(s), request(s), and/or response(s).

The functionality of any of the distributed server controllers may be combined, consolidated, and/or distributed in any number of ways to facilitate development and/or deployment. To accomplish recombining the functionality of the distributed server controllers, one may simply copy the executable program module code from the module collection and/or with other program modules, first ensuring the executable program module code has been compiled for the appropriate CPU of the controller for which it is destined, and/or data onto a local storage device of any of the various controllers. Similarly, the module collection may be combined in any number of ways to facilitate deployment and/or development. To accomplish this, one must simply integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single controller, and/or across numerous controllers to improve performance through standard load balancing data processing techniques. Furthermore, single instances may also be distributed across multiple controllers and/or storage devices; e.g., databases.

All program module instances and controllers working in concert may do so through standard data processing communication techniques.

The preferred centralized and/or distributed controller configuration will depend on the context of system deployment. Factors such as, but not limited to, the capacity and/or location of the underlying hardware resources may affect deployment requirements and configuration. Regardless of if the configuration results in more consolidated and/or integrated program modules, results in a more distributed series of program modules, and/or results in some combination between a consolidated and/or distributed configuration, communication of data may be communicated, obtained, and/or provided. Instances of modules (from the module collection) consolidated into a common code base from the program module collection may communicate, obtain, and/or provide data. This may be accomplished through standard data processing techniques such as, but not limited to: data referencing (e.g., pointers), internal messaging, object instance variable communication, shared memory space, variable passing, and/or the like (intra-application communication).

If module collection components are discrete, separate, and/or external to one another, then communicating, obtaining, and/or providing data with and/or to other module components may be accomplished through standard data processing techniques such as, but not limited to: Application Program Interfaces (API) information passage; (distributed) Component Object Model ((D)COM), (Distributed) Object Linking And Embedding ((D)OLE), and/or the like), Common Object Request Provider Architecture (CORBA), process pipes, shared files, and/or the like (inter-application communication). Messages sent between discrete module components may be facilitated through the creation and parsing of a grammar. A grammar may be developed by using standard development tools such as lex, yacc, and or the like, which allow for the inclusion of message generation and parsing functionality within and between modules. Again, the preferable embodiment will depend upon the context of system deployment.

User Interaction Systems

Figure 3:
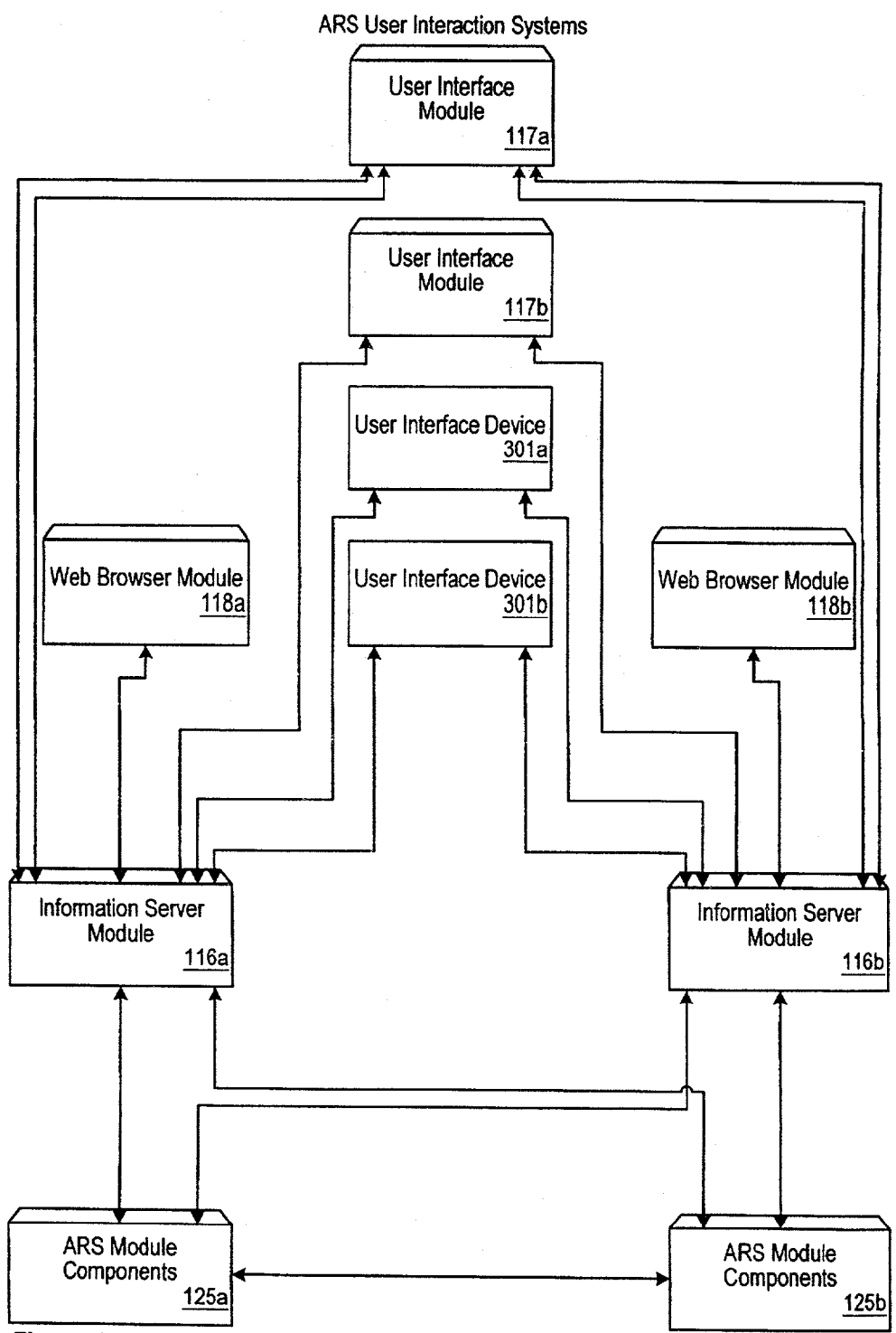
FIG. 3 illustrates another embodiment of a Application Replicator Server (ARS) and various user system interactions.

FIG. 3 illustrates an overview of various ARS user systems interactions. Information servers 116 act as an in-between for ARS module components 125 and user interfaces 117, user interface devices 301, web browsers 118, and/or the like. Generally, the information servers take requests. The information server can make further requests of ARS server modules components 125. ARS module components comprise modules from the module collection, modules detailed in FIG. 4, and/or the like, except it does not include and/or require a web browser module, user interface module, and/or information server module. Both the information server and ARS module components may service multiple instances of any of the user interfaces, user interface device, and/or the like, such as user interface components. However, it is preferable for the information server to act as a proxy for ARS module components rather than them directly interfacing with user interface components. Also, there may be one or more instances of the information server and/or ARS module components that may severally or jointly interact with one another.

Generally, ARS module component service information servers, which in turn service user interface components, i.e., the information servers accept requests from accessers. FIG. 3 illustrates that components may be numerously instantiated and may service multiple and various components. For example, the user interface 117 may make numerous communications. In one embodiment, the user interface 117a makes two communication with an information server 116a while also making two communications with another information server 116b; all while another instance of a user interface 117b also communicates with the information servers 116a–b. Similarly in another example, a user interface device(s) 301a–b may make numerous communications. In this example, the user interface device 301a makes two communications, one with an information server 116a, and a second with another information server 116b; all while another instance of the user interface device 301b also makes two communications, also one with an information server 116a, and a second with the other information server 116b. Similarly, the web browser 118a communicates with an information server 116a while another instance of a web browser 118b also communicates another instance of the information server 116b.

Similarly, information server modules 116 and ARS module components 125 may make multiple communications and may be instantiated multiple times. For example, ARS module components 125 may make numerous communications. In this example, the ARS module component 125a makes three communications with an information server 116a, another information server 116b, and with another instance of a ARS module component 125b (also, the ARS module component 125a may communicate with itself). Similarly, the ARS module components 125b makes three communications with an information server 116a, another information server 116b, and with the first instance of ARS module components 125a (also, the ARS module components 125b may communicate with itself). It should be noted, all the communications taking place as illustrated in FIG. 3 by lines may take place over and/or through a communications network 113 of FIG. 1.

Application Replicator Server

Figure 4:
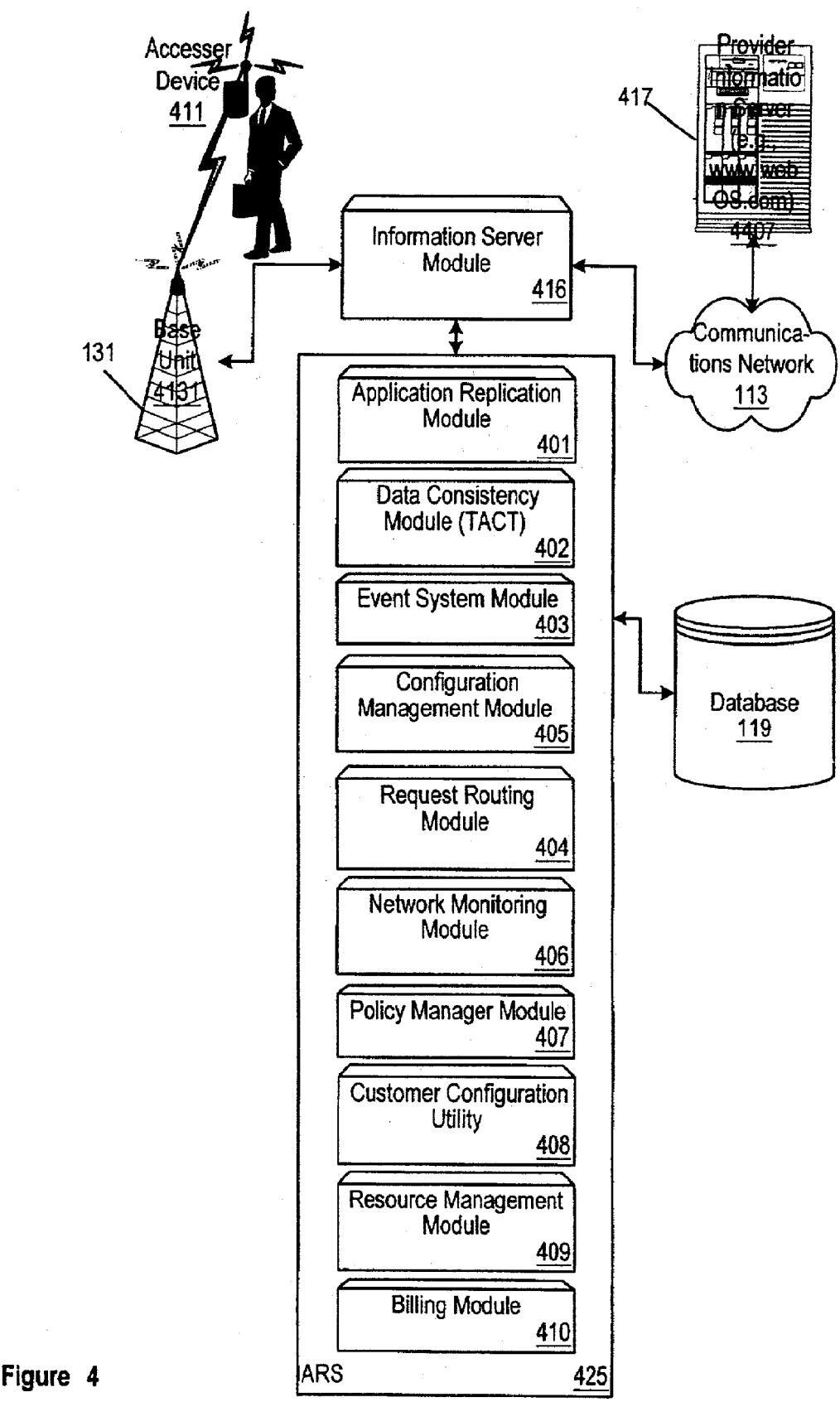
FIG. 4 illustrates one embodiment of an ARS and module components.

FIG. 4 illustrates one embodiment of the ARS 425 and its module components. In one embodiment, users, e.g., providers, engage the ARS 425 through user interface interactions as discussed in FIG. 3 that are fed through an information server module 116 running on an information server controller 201 of FIG. 2, commonly called an "information server" or a "web server." As will be discussed in further detail in FIG. 5, the information server 416 acts as a gateway between a base unit 131 and a communications network 113, that are each in turn disposed in communication with accesser devices 411 and providers 417, respectively. Upon the user's traversal of the appropriate navigation location hosted by a particular information server module 116, the information server module will obtain data (e.g., HTML or any text based markup language; streaming audio, video, data; Wireless Markup Language (WML) data, and/or the like) from the ARS 425 to relay to the requesting user.

Information servers act as a gateway for users to access the ARS. Information servers obtain information to serve requests over communications networks in ways, and employ protocols, well known to those skilled in the art. Note that Information Servers servicing the ARS may act as a gateway to base units 131 and/or a communications network 113 through various network interfaces 110, 133 as discussed in FIG. 1.

As noted above, the ARS 425 enables the users to create new nodes in different servers for load-balancing and or other efficiency reasons, without any manual intervention by the hosts of the service providers. In other words, the ARS 25 of the present invention is capable of creating, modifying, deleting and/or the like new nodes on the fly, upon user/subscriber request. The ARS 425 comprises a plurality of different modules to enable the creation of new nodes for replicating new and/or existing applications, which communicate with the database 119, as described in more detail below.

The ARS 425 comprises an application replication module 401 that is responsible for replicating the applications in the new nodes being created, upon request from the user. The data consistency module (such as Tunable Availability and Consistency Tradeoffs (TACT)) 402 ensures that the data being replicated along with the applications remains consistent at the new nodes. The data consistency module 402 is generally a library layer between the database replica and the applications being used. The data consistency module 402 may comprise of toolkits that allow Internet services to flexibly and dynamically choose their own availability/consistency tradeoffs, enabling differentiated availability/consistency quality of service. In one embodiment, the system may be typically defined as a switch, wherein the system either provides strong consistency with reduced availability of the systems' resources, or vice versa. According to another embodiment, the data consistency module 402 may be a more complex system where the system may allow the specification of a consistency level metric that results in probabilistic guarantees about system availability. One of the features of the data consistency module 402 is the ability to dynamically trade consistency for availability and performance in response to current system, network and client characteristics.

The event system module 403 receives requests from users and automatically executes commands in accordance therewith as well as with pre-determined and pre-programmed logic therein.

The ARS 425 further comprises a configuration management module 405 which adds the appropriate values to the applications' configuration files. In a nutshell, the configuration management module 405 manages the modules created along with their configuration to ensure that the different modules and/or different nodes being created on the different servers have similar configuration and are compatible with other.

There exists a request routing module 404 which is responsible for dynamically routing user requests for services and application appropriately to for appropriate load balancing and optimal usage of user resources throughout. According to one embodiment, the request routing system 404 is capable of dynamically ensuring that user requests are evenly spread out geographically and temporarily over the entire network of servers in the present system. According to another embodiment, the request routing system 404 provides customers using the present system with optimal routing facilities based on real-time load balancing.

The ARS 425 further comprises a network monitoring module 406 which is responsible for ensuring that the network performance remains optimal and for reporting network status changes to the policy manager periodically. The network monitoring system 406 continues to monitor network performance over a period of time. The present system also comprises a policy manager module 407 which fires off events such as crating new replications of software on different computer hardware nodes, tearing down old replications, turning off replications for customers who have not paid for their services or for customers who do not wish to pay for new nodes being created. The policy manager module 407 is able to change consistency patterns and/or change resource constraints in response to user demands.

The policy manger 407 is also responsible for activating different events in the network. For example, the policy manager, in response to user demands, is able to initiate the starting of a new replication, the ending of old replications, creation of new nodes or stopping the use of older nodes when necessary, when an appropriate user request is made.

The ARS 425 further comprises a customer configuration utility 408 which is really a Graphical User Interface (GUI) tool for users. The GUI is structured in such a way that it provides a user-friendly screen in which the users can decide the resources needed in accordance with their needs. The GUI configuration tool sets policies, such as the number of replications that a particular user needs in total, or needs to have live at any given time, the different status locations and the maximum payment policy that the user must abide by.

The present system further comprises a resource management module 409 which monitors the bandwidth of the network, the memory being utilized by the processes running in the network, the CPU regulators as well as it monitors all different parameters being effected by the running processes in the network.

Finally, the ARS 425 also comprises a billing module 410 which tracks the payment bills for the customers of the present system. The billing module comprises of logic which determines when users need to pay their bills, what their payment periods are, whether users will be automatically billed.

Figure 5:
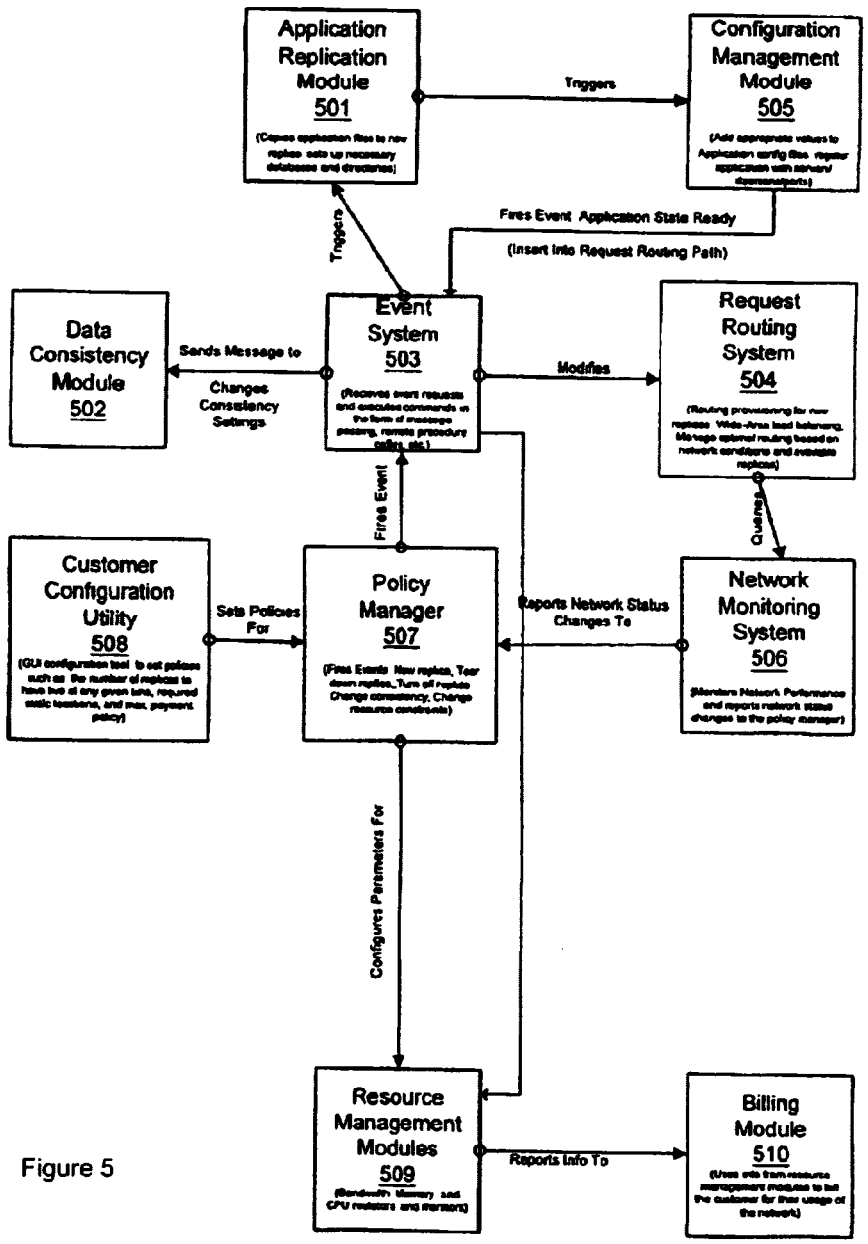
FIG. 5 illustrates one embodiment of the ARS system in accordance with the present invention.

FIG. 5 provides an overall system-level view of the present invention, wherein the different modules in the ARS interact therebetween to make the replication mechanism work efficiently. It should be noted, that the different modules are capable of interacting therebetween in many different ways, and the scope of the present invention should not limited by some of the exemplary configurations shown and discussed hereinafter.

As noted above, the present system comprises an event system 503 which receives event requests and executes commands by messages passing, remote procedure calls and/or the like. The event requests are received from the users and are passed on to the different modules that comprise the present system and will be discussed in more detail below. For example, the event system may send a message to the data consistency module 502 to change the consistency settings of the data being used and stored in the present system. The Data consistency module 502 uses the TACT system to ensure an efficient balance between the consistency and availability levels of the data in the present system.

The event system 503 also interacts with the application replication module 501 which is responsible for replicating applications/software between different nodes. According to one embodiment, a user may decide to utilize a plurality of different nodes to better balance the load of their processes. As a result, the application replication module 501 will copy application files and/or software to the new replicated node ("child node") that is similar to the node being replicated ("parent node"). The application replication module 501 sets up the necessary databases and directories in that the new node being created or an older existing nodes being modified so that the replicated node has applications/software and/or necessary data that is the mirror image of the older nodes, which is important for ensuring that the data and the applications being run are consistent between all the nodes.

The application replication module 501 triggers events in the configuration management module 505. The configuration management module 505 provides the appropriate values to the configuration files of the applications. The configuration management module 505 also registers applications with the servers being used, the daemons, the ports and/or the like. The configuration management module 505 comprises programs that runs continuously and exist for the purpose of handling periodic service requests that the network expects to receive, and forwards the requests to other programs, processes, modules, and/or servers as appropriate.

The application management module 505 also interacts with the data consistency module 502, which is also known as the TACT system. The data consistency module 502 ensures the data being used, generated, altered are amended remains consistent between the different servers being used by the user. As noted above, the data consistency module 402 is generally a library layer between the database replica and the applications being used, which may comprise of toolkits that allow Internet services to flexibly and dynamically choose their own availability/consistency tradeoffs, enabling differentiated availability/consistency quality of service.

In accordance with the present invention, the event system 503 also causes the request routing system 504 to modify the appropriate settings. The request routing system 504 is responsible for routing the new replications being made. The request routing system 504 is also responsible for wide-area load balancing. As a result, the request routing system 504 is capable for maintaining an efficient load balance throughout the network. The request routing system 504 is also responsible for providing optimal routing of process and resource requests based on the real-time network conditions and available replications for particular users/customers. In accordance with one embodiment of the present invention, the request routing system 504 is provided with logic that allows it to dynamically decide the optimal routing based on existing highway conditions and users desired by user.

The request routing system 504 queries the network monitoring system 506 to receive information for properly handling routing requests. The network monitoring system 506 monitors the network performance and reports network status to the policy manager 507 as well as the request routing system 504. Once the request routing system 504 has made a routing decision, the decision is provided to the network monitoring system 506 for updating the list of processes, resources and/or nodes being monitored. The network monitoring system 506 reports the networks status, and/or any changes thereto to the policy manager 507. The reporting may be done periodically, intermittently or as defined by the various algorithms that may be utilized in accordance with user demands.

The policy manager 507 dynamically and in real-time fires off events in response to user demands, customer needs as well as in response to utilization of the network at any given point. The policy manager 507 creates new replications, tears down old replications, turns off replications that are already being made or are in existence. The policy manager 507 is also capable of changing the consistency levels of the data desired by particular users. In addition, the policy manager 507 changes the resource constraints to ensure efficient usage of the resources that exist. For example, according to one embodiment, the more constraints that are put on the resources being used, the less easy and frequent it is to change the state of the underlying resources. In accordance with the present invention, the policy manager 507 is also capable of dynamically adjusting the consistency in accordance with the availability of the data and/or applications desired by the user(s).

In accordance with the present invention, a customer configuration utility 508 configures policies for the policy manager 507. The customer configuration utility may be provided in a graphical user interface (GUI) which enables the user to set the appropriate policies, such as the number of live replications being performed at any given time, the desired number of static locations, the maximum payment policy and/or the like. The resources granted to any given user might be dependent on the payment policy chosen by that user. Since the present invention allows dynamic replication of nodes without any manual intervention, the customer configuration utility is capable of dynamically firing off requests for creating new nodes or removing existing nodes in response to user requests/demands.

The policy manger also interacts with the resource management modules 509 by configuring the parameters that are used and/or monitored by the resource management module. The resource management module monitors the network to ensure that the bandwidth, memory, the CPU, and/or the other resources are being utilized in the most efficient manner. Depending on the usage by a particular user, the resource management modules 509 reports information to the billing module 510.

The billing module 510 is responsible for using information provide by the resource management module 509 to bill the customers for their usage of the network. As noted above, the billing module 510 is capable of billing automatically on a periodic basis or on an intermittent basis depending on the user preference.

According to the invention, the various modules illustrated in FIG. 5 may interact with each other to ensure a dynamic, seamless, and scalable network. Thus, while a few exemplary embodiments have been described herein, the scope of the present invention is not to be limited by the discussed examples, but must be considered to include a variety of connections between the different modules.

Figure 6:
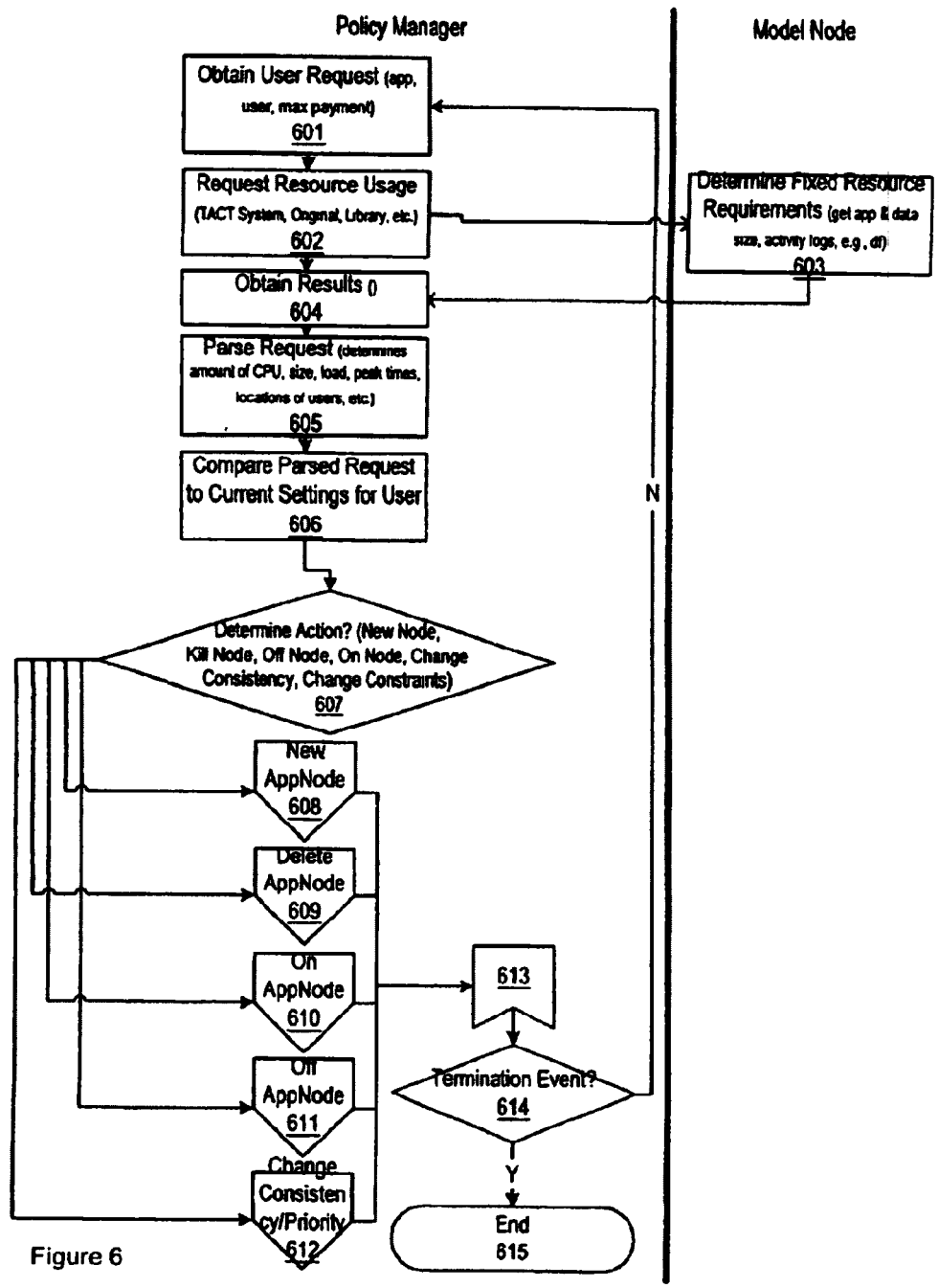
FIG. 6 provides a flow diagram of the different steps taken by the policy manager.

FIG. 6 provides a flow diagram showing the different steps that are taken by the policy manager and its effect at the model node being created, altered and/or deleted by the present application by the system of the present invention.

In step 601, the policy manager 507 obtains a user request. The user request may comprise of the applications/software needed, the user identification, the maximum or minimum payment that the user is willing to pay, and/or the like. The policy manager 507 is able to determine dynamically, and in real-time, based on predetermined algorithms the different number of nodes that the user must be granted. The system may also be provided an indication of the geographical locations in the network where the user/customer wishes to create, alter and/or delete applications/software in accordance with their needs. In step 602, the policy manager 507 requests the resources that are needed and/or that will be used by the user for its needs. For example, the policy manager 507 may need to know the amount of usage of the TACT system that the users will require. The policy manger 507 may also need to know the amount of resources the user used prior to the new request made in steps 601.

Based on the user request, the present system determines the resources that are required for the user, in step 603. For example, according to one embodiment, the present system determines the applications and the data that the user will need. The present system also determined based on the user request, the application and data size that must be stored on the new nodes being created, old nodes being deleted and/or the existing nodes being modified. The model node that is being acted upon may also maintain activity logs in response to the request resource usage. Once the fixed resources are determined in step 603, the results are provided to the policy manager 507 in step 604.

In step 605, the policy manager 507 parses the request that was provided thereto. As a result of the parsing of the request, the policy manager 507 determines the amount of CPU resources that are needed, the hard drive size that is required and must be set aside, the load usage by the users, the usage frequency for the different times of usage of the server, the nodes being created, the locations of the users, peak times for usage, and/or the like. The policy manager 507 determines the peak times of the users' usage so that it can efficiently allocate the necessary resources for allowing efficient usage of the nodes being created, deleted and/or modified.

In step 606, the parsed result is compared to the current settings for the underlying user. In other words, if the user is already an existing subscriber of the current system, its current usage and pattern settings are compared to the new input provided in step 601. In step 607, the policy manager 507 determines the action(s) that need to be taken in response to the user request. Some of the actions that may be performed include adding a new node, removing an old node, turning off an existing turned-on existing node, turning on an existing turned-off node, changing the consistency levels of existing nodes, changing the constrains on the nodes, and/or the like.

As a result of determining the action that needs to be taken, new nodes may be created in step 608, an existing node may be deleted in step 609, an existing application node may be turned on in step 610, an existing application node may be turned off in step 611, and/or the consistency and/or priority of existing nodes may be changed in step 612.

In accordance with the present invention, an existing customer of the present server network may have certain nodes that are assigned thereto but are turned off in response to the users earlier requests. As a result, in step 610 an existing node that was initially assigned to the user but turned off may be turned back on in response to the usage change requested by the user. Similarly, an existing node that is in current usage by the user may be turned off in response to the user's new request in step 611. Once an action in response to user's request has been performed on the application nodes in steps 608–612, the system proceeds to step 613. In step 614, the policy manager 507 checks to determine whether the event must be terminated. In other words, the policy manager decides if it should end its activity that was initiated in step 601 in response to the user request. If the policy manager 507 determines that it must continue acting and receive new user requests, then the control is taken back to step 601 and the new user request is obtained from the same or some other user. On the other hand, where the policy manager 507 determines that its current activity flow must end, the process proceeds to step 615.

Figure 7:
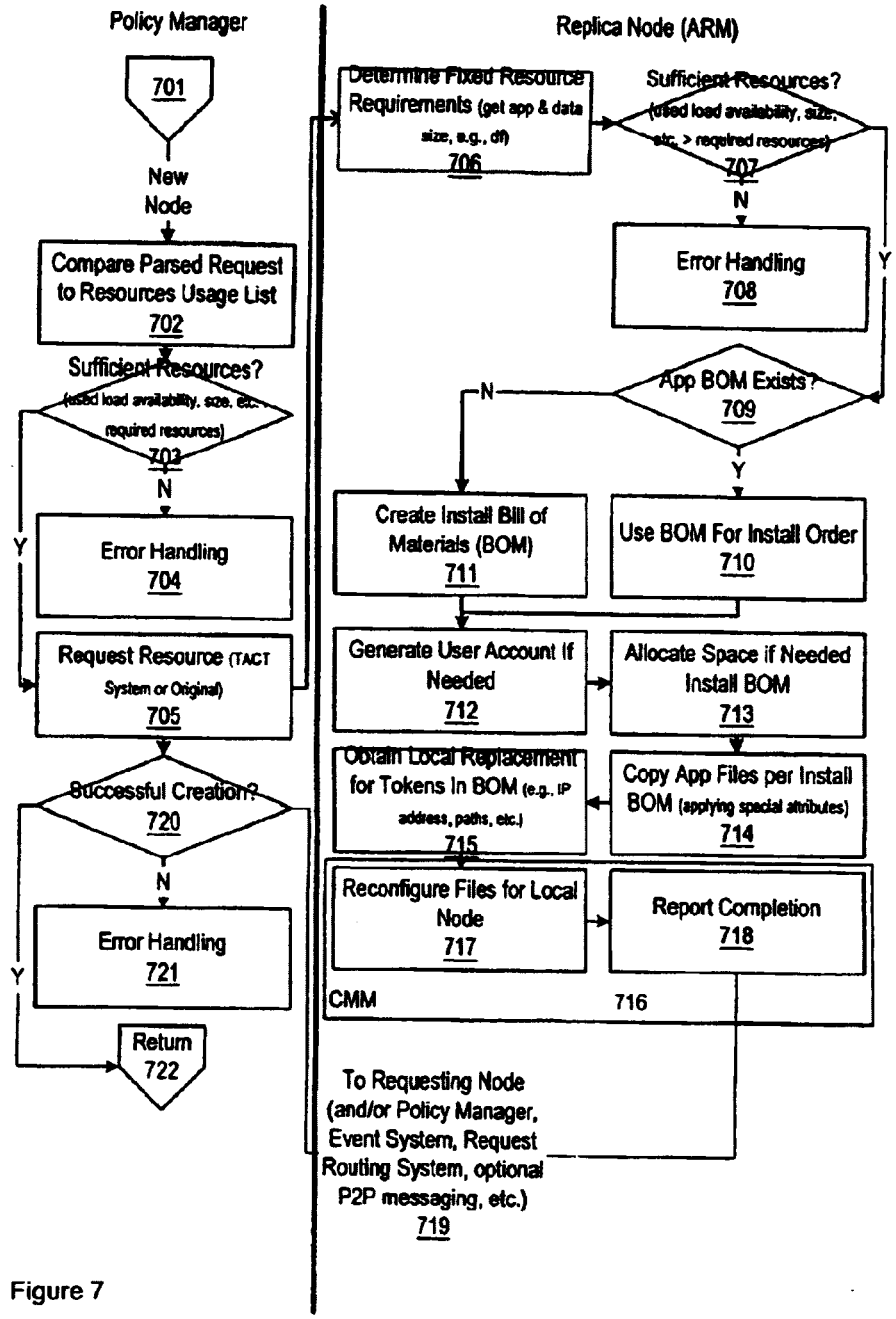
FIG. 7 illustrates the flow for creating a new application node in response to the user request.

FIG. 7 provides an overview of the flow for creating a new application node in response to the user request. The flow for creating a new node starts at step 701, where, in response to the users request to create a new node in step 608 of FIG. 6, the policy manager initiates the process that will result in a new application node at the end of the present flow.

In step 702, the user's parsed request is compared to the resources usage list. The resource usage list maintains a listing of all the load availability, the sizes of the different usage by different users, the resources required to accomplish different tasks and/or the like. As a result, in step 703 the policy manager determines whether sufficient resources exist to support the user's request for adding a new node. To ensure that sufficient resources exist to support the user's request, the existing load usage of the network, and/or the sizes of the different tasks being run on the various different servers of the network are looked at. The existing resources are compared to the resources required for the user's processes/applications. In step 704, if the system does not have sufficient resources, then error handling is initiated in accordance with a predetermined mechanism. On the other hand, if sufficient resources exist to provide a new application node to the user, then, in step 705, the present system initiates the resource request.

In step 706, the application replication module determines the fixed resource requirements for accomplishing the user request. As a result, the application replication module obtains/determines the application and the data sizes. In step 707, the ARM checks to determine if sufficient resources exist to create the necessary node for the user. As a result, the ARM looks at the existing load availability based on other nodes being used as well as other tasks/processes being run on the system. In addition, the ARM checks the sizes of the various processes being run and the resources required therefor. If the load availability is greater than the required resources for creating the new node, then the system proceeds to create a new node. On the other hand, if the required resources are more than the available resources, then the present system aborts the process of creating the new node and initiates error handling in step 708.

In step 709, the system checks to determine if an application's bill of material (BOM) exists. If the bill of material does not exist, then the ARM creates a new installation bill of materials in accordance with its existing algorithms. On the other hand, if the bill of material exists, then in step 710 the ARM proceeds to use that existing bill of material for installation the necessary software/applications during creation of the new node.

After creating a bill of material in step 711 and or determining that the appropriate bill of material exists in step 710, the flow proceeds to step 712. In step 712, the ARM generates a user account if necessary. Next, in step 713, the ARM allocates the necessary space for installing the bill of material in accordance with the present invention.

In step 714, the ARM copies application files for each install bill of material and applies a special attribute needed at the space allocated in step 713. In step 715, the replicated node obtains local replacement for all the tokens in the bill of material, such as its IP address, the different paths need for accessing the local files and directories, and/or the like.

Once the local replacement for tokens in the bill of material have been obtained/created, the flow proceeds to the configuration management module, as shown in box 716. In step 717, the files for the local nodes are configured in accordance with other nodes that are being used by the underlying user. In step 718, the ARM reports completion of the creation of the new node, and the in step 719 the flow proceeds back to step 720. In step 719, once completion of creation of the new node has been reported, the flow proceeds to the requesting node. The creation of the new application node is reported to the event system module 503, the request routing system 504, optional peer-to-peer messaging system and/or any other module that may need this information.

In step 720, the policy manager 507 checks to determine if an application node was successfully created. If the application node was not created properly, an error is signaled and the system initiates the error handling procedures in accordance with predetermined policies set by the providers of the present system. On other hand, if the application node was successfully created then the system returns back to the procedure that invoked the application creation procedure.

Figure 8:
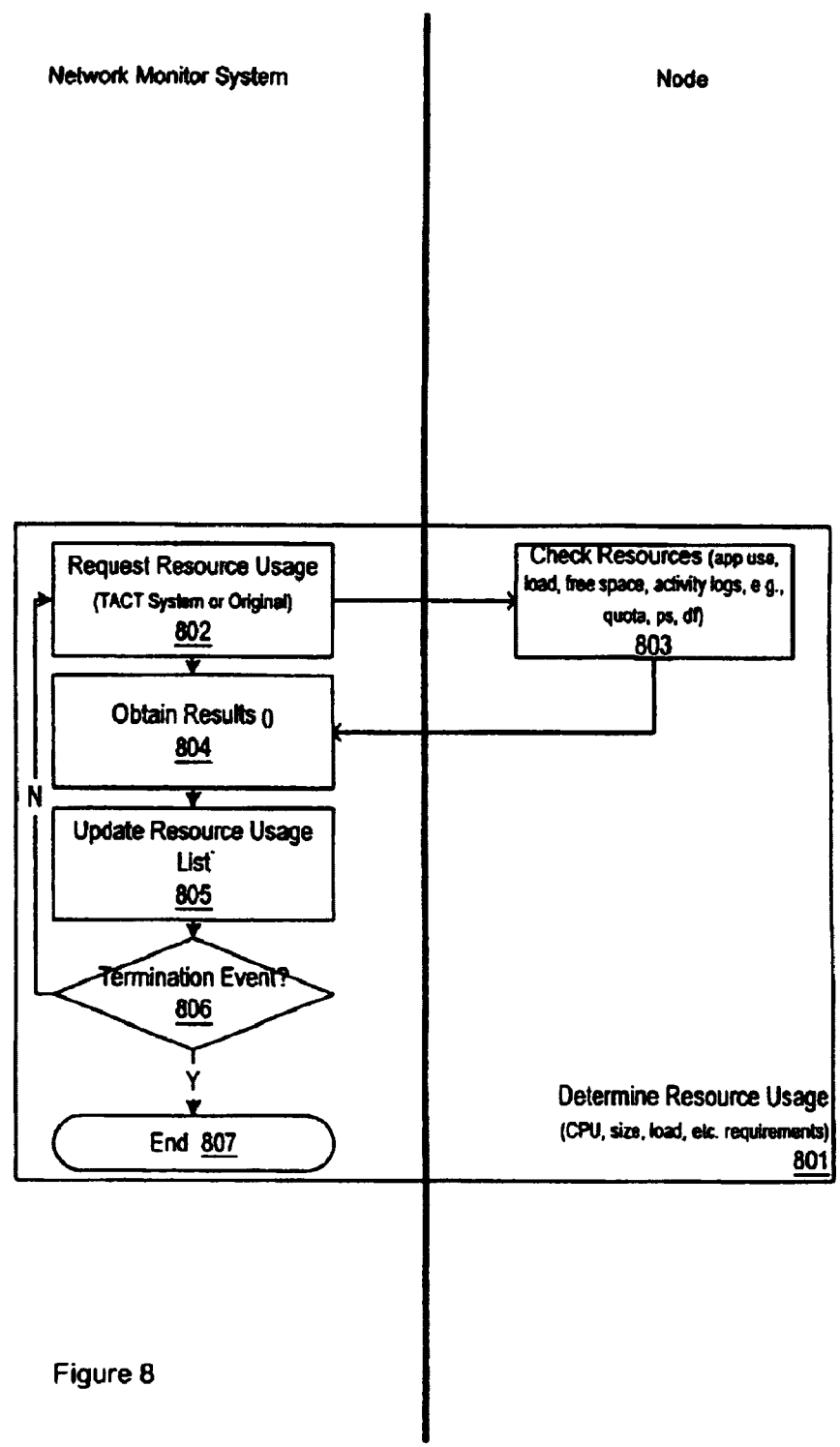
FIG. 8 illustrates the flow for maintaining and determining the resource usage during the creation, deletion and/or modification of new application nodes.

FIG. 8 shows the flow necessary for maintaining and determining the resource usage during the creation, deletion and/or modification of new application nodes in accordance with the present invention. At noted in box 801, the resource usage that is determined is CPU usage, size of memory needed, load, and/or the like.

The flow starts at step 802 where the user requests resource usage, which may be for the TACT system when data already exists, or for a new application. The resource being requested is checked against existing resources in the present system. For example, the resource usage request is checked against the applications being used, current loads, free space available on the servers by examining the activity logs and/or the like in step 803. The results of the resource checking being performed are provided in step 804, as a result of which the resource usage list is updated in step 805.

In step 806, the network monitor module checks to determine whether the requesting events should be terminated. If the network monitor system decides that the event should be terminated, the flow proceeds to step 807. On other hand, if the event need not be terminated, the flow is returned back to step 802, and new users and/or existing users are allowed to make usage request in accordance with the flow described herewith.

Figure 9:
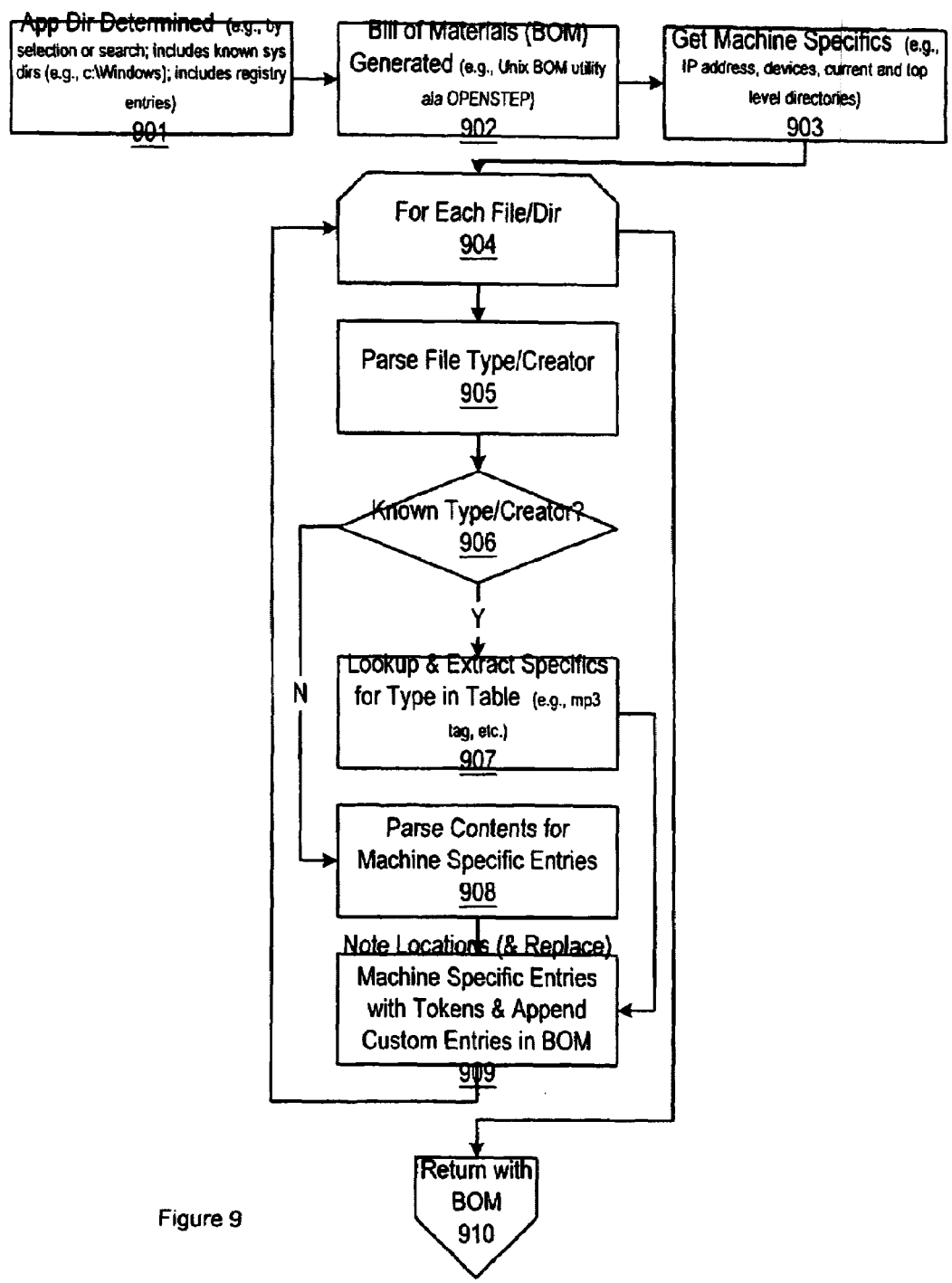
FIG. 9 provides an overview of the creation of the bill of materials on the Application Resource Module (ARM)

FIG. 9 provides an overview of the creation of the bill of materials on the ARM. In step 901, the present system initiates the process of determining the directory in which the application is stored and/or should be stored. The application directory may be determined by a simple selection procedure and/or by searching the existing directories, which may include looking at existing known system directories and/or registry entries in the system. In step 902, a bill of materials is generated. In step 903, the present system obtains the machine specifics. The machine specifics may include the Internet protocol address (also known as the IP address), the devices used or to be used and the current as well as the top level directories in the machine being used.

In step 904, the present system initiates the process of creating an application bill of materials for each file and/or directory. The file type and/or creator is parsed to obtain the individual fields, in step 905.

In step 906, the system checks to see if the type and/or the creator is known to the system. If the type and/or the creator of the file is known to the system, a lookup is performed to extract the specifics for the type from the existing tables and/or lists in the system. An existing type might be, for example, a MP3 tag and/or the like. On other hand, if the type or the creator of the file being created in the bill of material is not known, the contents for the machine specific entries are parsed in step 908.

In step 909, the locations are noted by the present system and/or replace the machine specific entries with the appropriate tokens. The custom entries are appended in the bill of material. This process is repeated numerous times for each file and/or directory being installed in the bill of material. Once the system creates a specific entry for each file and/or directory in the bill of material, the process ends and the created bill of material is returned back to the procedure that invoked the bill-of-material-creation-procedure, in step 910.

Figure 10:
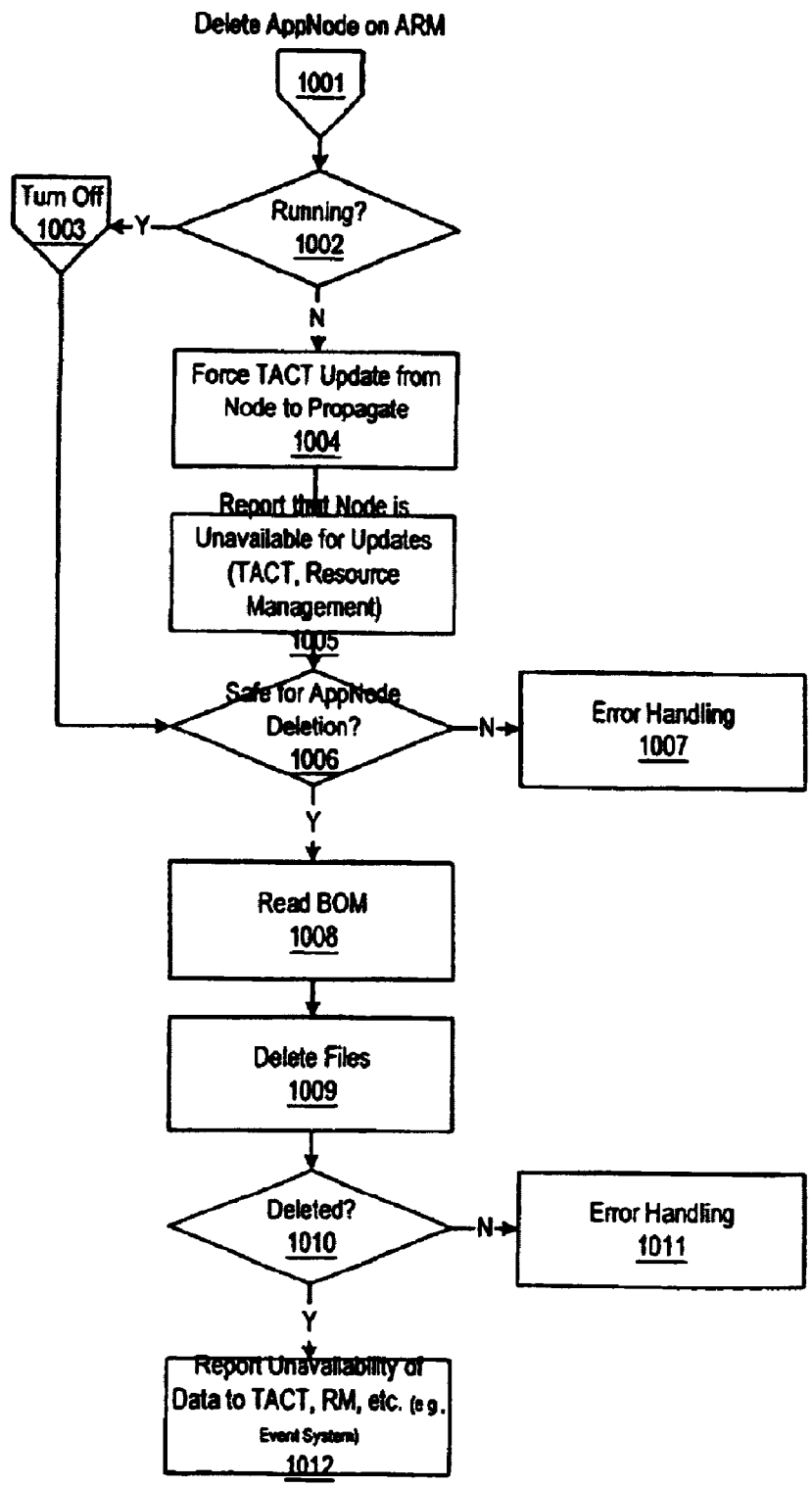
FIG. 10 provides a flow diagram for the deletion of an application node on the ARM.

FIG. 10 provides a flow diagram for the deletion of an application node on the ARM. The deletion of the application node is initiated in step 1001.

In step 1002, the system checks to see if an application node is running on the ARM. If the application node is running on the ARM, it is turned off in step 1003, and the flow proceeds to step 1006 where the application node is checked for checking if it is safe to be deleted. On other hand, if the application node is not running, a TACT update is performed on the node that is to be propagated (or replicated) to see if the data has been replicated consistently. In step 1005, a report is made if the node is not available for update and also for examining the TACT and/or resource management modules. Next, the flow proceeds to step 1006 where the system checks to determine if the application node is safe for deletion. If the application node is not safe for deletion, which would be the case where a TACT update has not been performed, the system initiates error handling in step 1007. On other hand, if the application node is safe for deletion, the bill of materials is read in step 1008.

After the bill of materials has been read, the files are deleted in step 1009. In step 1010, the present system checks to ensure that all the necessary files have been deleted. If all the files have not been deleted, error handling is initiated in step 1011. On the other hand, if all the necessary files have been deleted, unavailability of the node is reported in step 1012 to TACT, the resource management modules and/or any other modules that may in the future look for data from the node that was just deleted.

Figure 11:
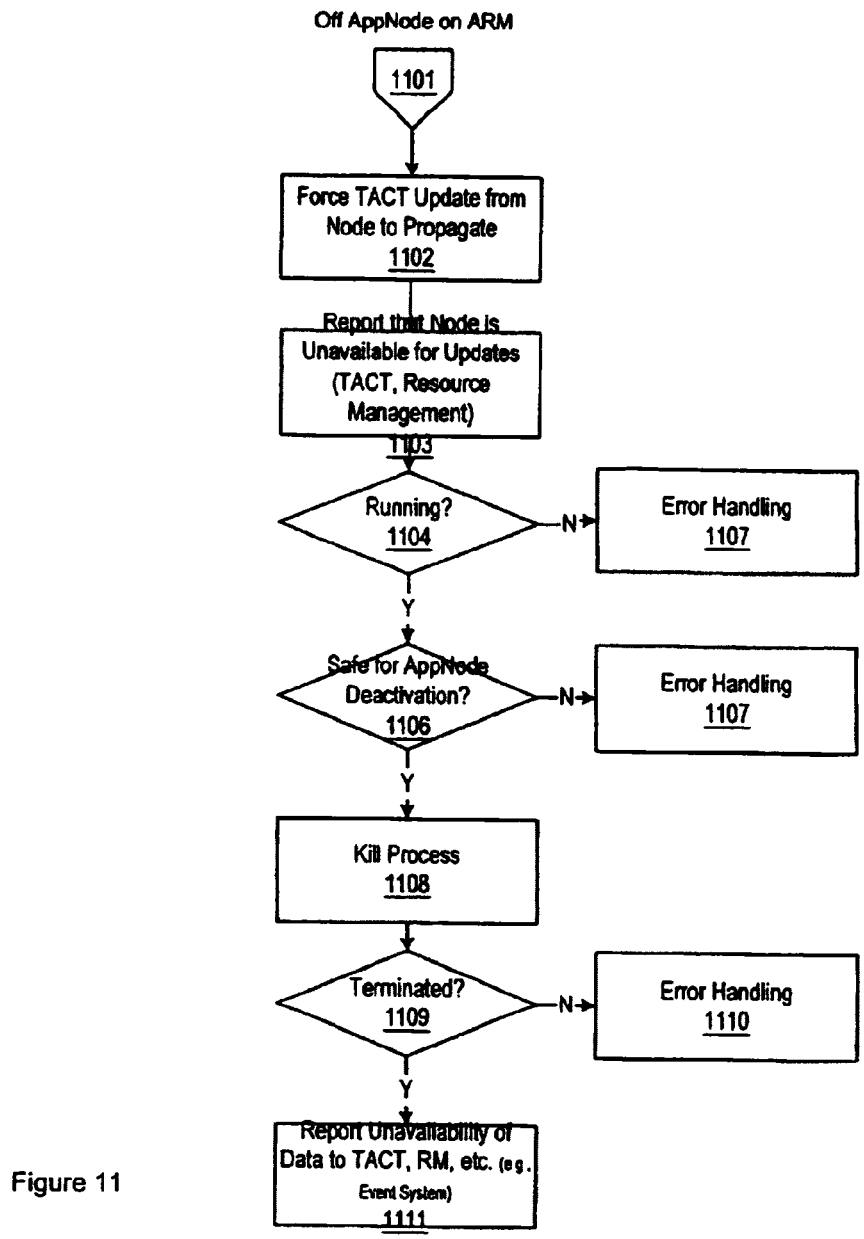
FIG. 11 illustrates the flow for turning off an existing turned-on application node on the ARM.

FIG. 11 illustrates the flow for turning off an existing turned-on application node on the ARM. The process of turning off the existing application node is initiated in step 1101.

In step 1102, the present system initiates a TACT update from the node that is to be propagated/replicated. In step 1103, as a result of the TACT update in process, the unavailability of the node is reported to the TACT module and to the resource management module. In step 1104, the system checks to see if the node that is to be turned off is running and/or has any live processes thereon. If the node is not running, then an error handling is initiated in step 1107, because there the underlying node is already turned-off. On the other hand, if the node is running, then the present system sends out a signal indicating that it is safe to deactivate the application node.

In step 1106, the present system checks to determine if the application node is safe for deactivation. If the application node is not safe for deactivation then an error handling is initiated by sending the control back to step 1107. On the other hand, if it is safe to deactivate the application node, then a kill process is initiated in step 1108.

In step 1109, the system checks to see if the process has been terminated as well as if the application node has been deactivated. If the process has not been terminated and/or the application node has not been deactivated then error handling is initiated in step 1110. On the other hand, if the process was successfully terminated then unavailability of the turned-off application node is reported in step 1111 back to the TACT module, to the resource management module, as well as to any other module that would look for data and/or application from the turned off application node.

Figure 12:
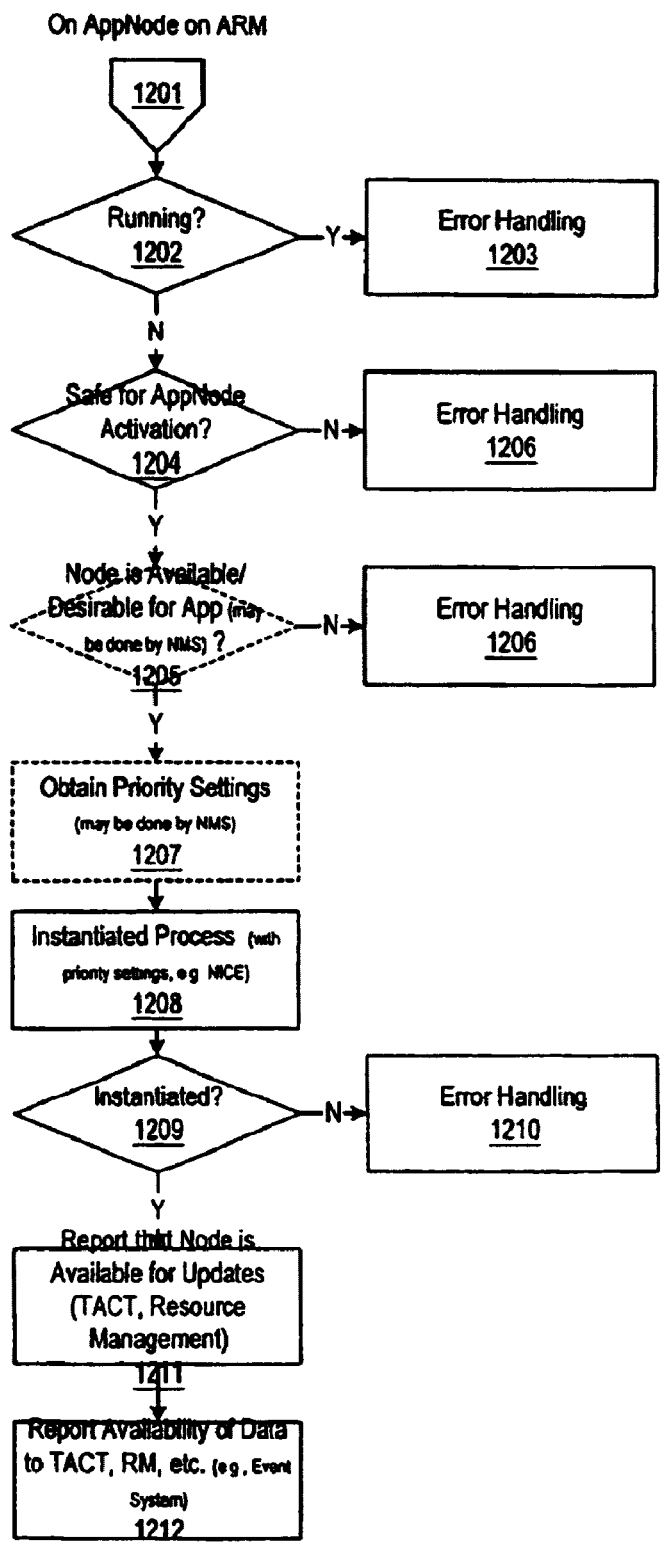
FIG. 12 provides a flow diagram of the process of turning on an application node on the ARM.

FIG. 12 provides a flow diagram of the process of turning on an application node on the ARM. The process starts with step 1201 in which the user initiates or provides an indication of its desire to turn on an existing application node.

In step 1202, the present system checks to see if the application node is running. If the application node is currently running, it means it has an existing process that must be turned off. If the application is running, error handling is initiated in step 1203. On the other hand, if no existing application is running on the application node (i.e., the application node that is to be turned on is idle), then the present system checks to see if it is safe to turn on the application node and/or activate it, in step 1204. If it is not safe to activate the application node then error handling is initiated in step 1206. If, however, it is safe to activate the application node then error handling is initiated in step 1206.

Where it is safe to activate the application node, the system checks to see if the node is available and/or desirable for the application that is to be propagated/replicated thereon, in step 1205. It should be noted that step 1205 is optional and is merely one exemplary embodiment that may be performed or added to the flow in accordance with the present invention. If the node is not available and/or desirable for the application that is to be performed thereon then error handling is initiated in step 1206. On the other hand, if the node is desirable, the prior settings are obtained in step 1206. According to one embodiment, the prior settings may be performed by the network monitoring system of the present invention in step 1207.

In step 1208, the process is instantiated with the prior settings. In step 1209, the present system checks to see if the process was instantiated properly. If the process was not instantiated properly, error handling takes place in step 1210. On the other hand, if the process was properly instantiated, it is reported to the system that the node is available for updates in step 1211. According to one embodiment of the present invention, the report informs that the node is available for updates and may be provided to the TACT module, the resource management module and/or any other module that may need the information.

Finally, in step 1212, availability of the data on the node being turned on is a reported to the TACT module, the resource management module, and/or any other module that may need to use the data being stored, created, updated, and/or appended the node.

Figure 13:
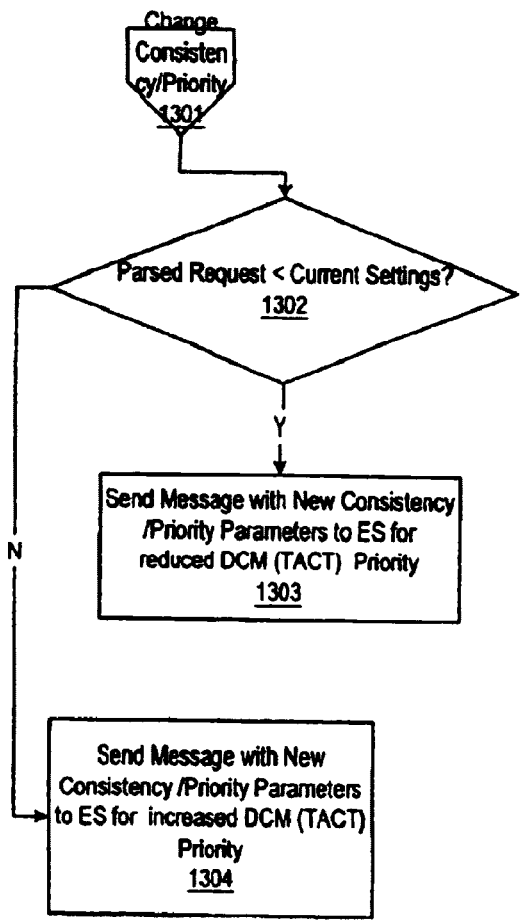
FIG. 13 illustrates the flow necessary for changing the consistency and/or the priority of the node under operation.

FIG. 13 illustrates the flow necessary for changing the consistency and/or the priority of the node under operation. The changing of the consistency and/or the priorities is initiated in step 1301. The request message is parsed to obtain the values of the various fields included in the request. In step 1302, the system checks to see if the parsed request is less than the current settings. If the parsed request is less than the current settings then a message with the new consistency and/or priority parameters is sent to the event system module 503 to reduce the data consistency module priority, in step 1303, and the procedure terminates.

On the other hand if the parsed request is not less than the current settings (i.e., the parsed request is greater than or equal to the current settings) then a message is sent with the new consistency priority parameters to the event system module 503 to increase the DMS priority in step 1304.

Figure 14:
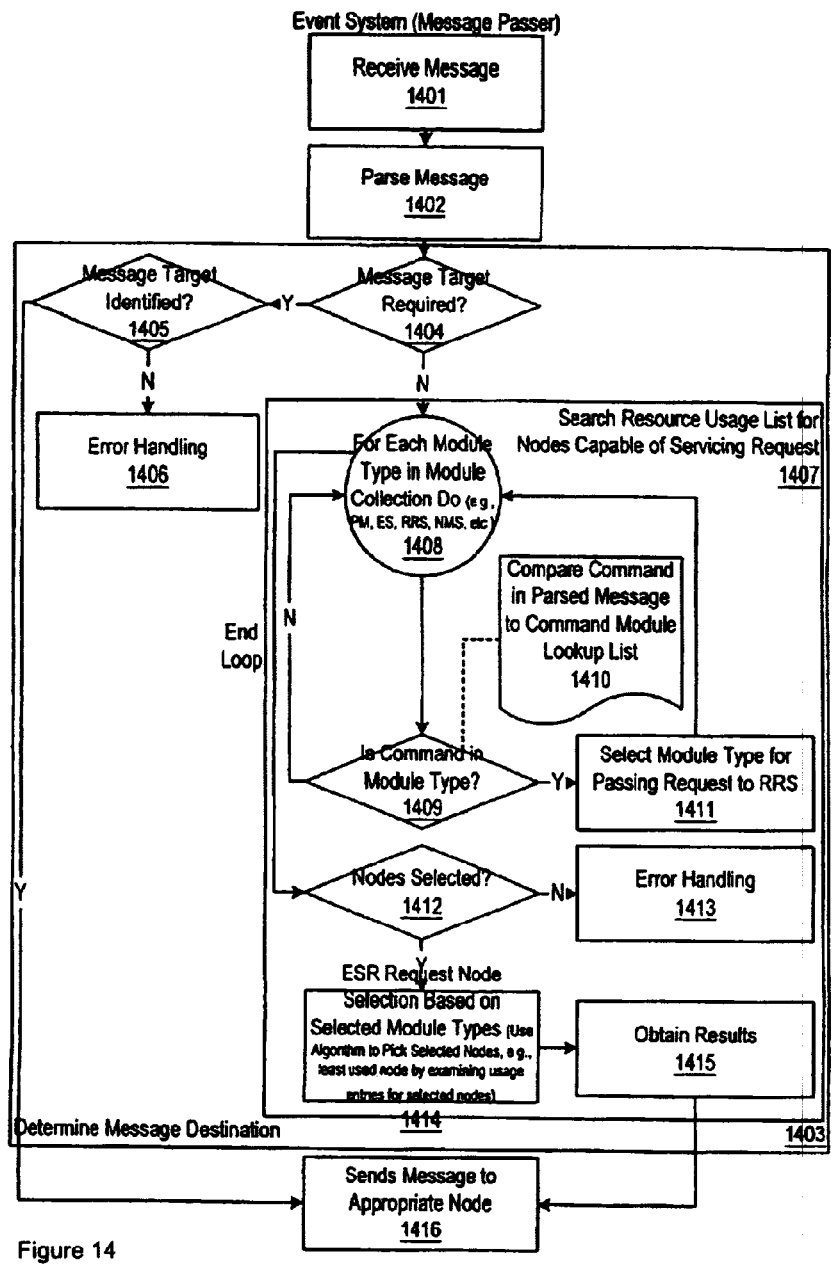
FIG. 14 illustrates the message parsing routine that the event system module 503 must undertake.

FIG. 14 illustrates the message parsing routine that the event system module 503 must undertake. In step 1401, a message is received from the user. In step 1402, the received request is parsed to obtain the parameters being passed and/or entered by the user and the flow proceeds to box 1403.

Box 1403 provides an overview of the procedure for determining the destination of the message being parsed. In step 1404, the system checks to determine if a message target is required. If a message target is required, the flow proceeds to step 1405 to determine if the message target has been identified. If the message target is not identified then error handling is initiated and the process terminates. On the other hand, if a message target was identified then the process proceeds to send the message to the appropriately identified node, as shown in box 1416.

However, if the message target is not required then the flow proceeds to step 1408. In step 1408, actions are initiated for each module type in the module list. The different modules that may be called upon to perform an action are policy manager module, event system module, the resource routing system module, network monitoring system module and/or the like. In step 1409, the system checks to see if the command provided is of the proper module type. As shown in block 1410, the command in the parsed message is compared to the command module lookup list that exists in the system. If the command in the module type is recognized by the system, the flow passes to step 1411 where the module type for passing the request to the resource routing system 504 is selected.

In step 1412, the system checks to determine if the nodes have been appropriately selected. If the nodes have not been appropriately selected, error handling is initiated in step 1413. On the other hand, if the nodes were appropriately selected then the event system requests selection of the node. In other words, a node is requested based on the selected module type. There are various different algorithms that may be used to pick a selected node. For example, according to one embodiment, the node may be selected by the least used node algorithm after examining the usage entries for the selected nodes. According to another embodiment, the system may select nodes based on the shortest geographical distances to the node being used. According to yet another embodiment, the system may pick a node by checking to see if the user already has any process running on the node to be selected.

In step 1415, the results for the selection of the node are obtained and in step 1416 the system sends the message to the appropriately selected node in accordance with the results obtained.

Figure 15:
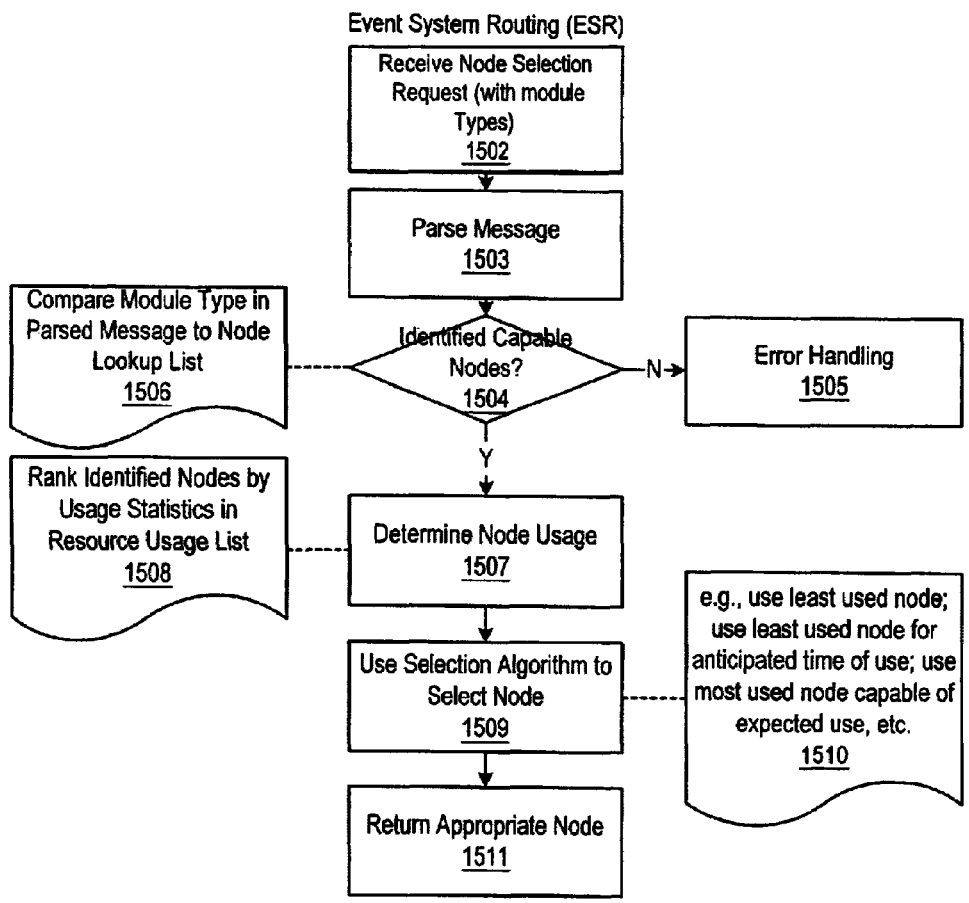
FIG. 15 provides an overview of the flow for the event system routing mechanism.

FIG. 15 provides an overview of the flow for the event system routing mechanism. In step 1502, a node selection request is received by the event system routing module with the necessary module type. In step 1503, the received message is parsed to get the different parameters that are necessary to perform further action.

In step 1504, the system checks to see if the nodes capable of performing the events have been identified. If the nodes have not been identified then error handling is initiated in step 1505. On the other hand, if the nodes capable of performing the events have been identified then node usage is determined in step 1507. According to the present invention to identify the capable node, the system checks to see the node lookup table and obtains the module type by making comparisons between the parsed message and the information stored about the various modules in the lookup table. To determine the node usage, the present system ranks the identified nodes by user statistics in the resources usage list, as shown in block 1508.

In step 1509, user selection algorithms are used to select the appropriate node. According to one embodiment, one of the algorithms used to select the node may be based on the least used node. According to another embodiment, the algorithms may be based on the least used node for an anticipated time of the use. According to yet another algorithm, the node that is capable for the most amount of usage during expected used time may be used.

Finally, in step 1511, the appropriate node is returned to the system for performing further actions thereon.

Figure 16:
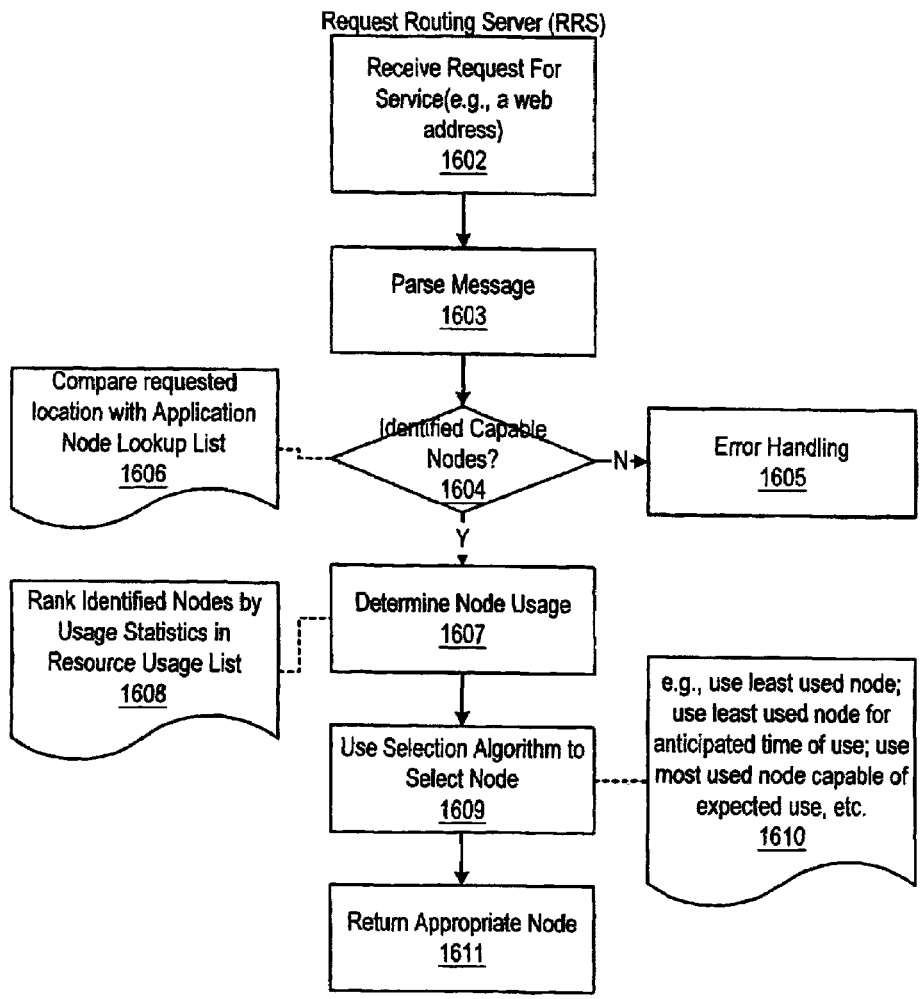
FIG. 16 provides an overview of the request routing server of the present invention.

FIG. 16 provides an overview of the request routing server of the present invention. In step 1602, a service request is received by the resource routing server. The request may be similar to receiving a Web address, wherein the system automatically goes and performs the action at the appropriate Web address. In step 1603, the received message is parsed.

In step 1604, the system checks to determine whether the identified nodes are capable of performing the request made by the user. To determine whether the nodes are capable of performing in accordance with the user's request, the system compares the requested location with the application node lookup list that is already in existence within the system, as identified by block 606. If the identified node is not capable of performing the request then error handling is initiated in step 1605. On the other hand, if the node is available of performing the request, then the appropriate node usage is determined in 1607.

Identified nodes are ranked by user statistics in the resource usage list, as indicated by step 1608. The flow proceeds from step 1607 to step 1609 where a selection algorithm is utilized to select the appropriate node for usage. Some of the algorithms, as noted above, may be based on the least used node for an anticipated piece of time, and/or nodes currently being used that are capable of the maximum expected use during the use by the user. Once the node that is most appropriate for usage is selected, the system proceeds to step 1611 where the request routing server returns the appropriate node to the system for further action thereon.

It is to be understood that the above description is only representative of illustrative examples of embodiments and implementations. For the reader's convenience, the above description has focused on a representative sample of all possible embodiments, a sample that teaches the principles of the invention. Other embodiments may result from a different combination of portions of different embodiments. The description has not attempted to exhaustively enumerate all possible variations.

It should be recognized that the method and system of the present invention has many applications, and that the present invention is not limited to the representative examples disclosed herein. Alternate embodiments may not have been presented for a specific portion of the invention. Some alternate embodiments may result from a different combination of described portions, or other undescribed alternate embodiments may be available for a portion. This is not to be considered a disclaimer of those alternate embodiments, because many of those undescribed embodiments are within the literal scope of the following claims, and others are equivalent.

It is to be further understood that the tasks described in the following claims can be sequenced in many different orders to achieve the desired result. Thus, the scope of the present invention covers conventionally known variations and modifications to the system components and the method steps described herein, as would be known by those skilled in the art.

What is claimed is:

1. A method for event routing in a network comprising more than one node, the method comprising:
    assigning a node to a user;
    storing user data only on the node assigned to the user;
    receiving a request from the user;
    parsing the request to obtain values therefrom;
    determining whether the node can handle an event corresponding to the request based on the values, and when the node can not handle the event:
        identifying a plurality of nodes capable of handling the event based on the values;
        determining node usage of the plurality of nodes;
        selecting an appropriate node from the plurality of nodes for handling the event, based on the node usage; and
        copying applications and the user data from the node assigned to the user to the appropriate node, after which the appropriate node handles the request.

2. The method of claim 1, wherein the plurality of nodes capable of handling the event are identified by comparing a module type value in the request to a node lookup table located on the network.

3. The method of claim 2, wherein the node usage is determined by ranking the plurality of nodes in accordance with usage statistics in a resource usage list.

4. The method of claim 3, wherein the appropriate node for performing the event thereon is selected based on a least-used node algorithm.

5. The method of claim 3, wherein the appropriate node for performing the event thereon is selected based on an algorithm for determining a least-used node for an anticipated time of use.

6. The method of claim 3, wherein the appropriate node for performing the event thereon is selected based on an algorithm for determining a node most capable of performing the event.

7. The method of claim 6, wherein the request is parsed to obtain values of a plurality of fields for making comparison to data stored in the node lookup table and the resource usage list.

* * * * *